(12) United States Patent
Sawayanagi et al.

(10) Patent No.: US 6,726,165 B2
(45) Date of Patent: Apr. 27, 2004

(54) BRACKET CONNECTING STRUCTURE

(75) Inventors: Masahiro Sawayanagi, Haibara-gun (JP); Isao Yoneyama, Toyota (JP); Goro Takahashi, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/142,790

(22) Filed: May 13, 2002

(65) Prior Publication Data
US 2002/0166932 A1 Nov. 14, 2002

(30) Foreign Application Priority Data

May 11, 2001 (JP) ..................................... P2001-141955
May 11, 2001 (JP) ..................................... P2001-141984

(51) Int. Cl.[7] ............................................. A47B 96/00
(52) U.S. Cl. ................................... 248/224.8; 296/97.9
(58) Field of Search ........................... 248/224.8, 475.1, 248/476; 296/97.9, 97.12, 97.13

(56) References Cited

U.S. PATENT DOCUMENTS

| 5,031,954 | A | * | 7/1991 | Peterson et al. ............ 296/97.9 |
| 5,299,106 | A | | 3/1994 | Buchheit et al. |
| 5,451,022 | A | * | 9/1995 | Peterson ................. 248/289.11 |
| 5,468,041 | A | * | 11/1995 | Viertel et al. ............... 296/97.9 |
| 5,498,056 | A | | 3/1996 | Viertel et al. |
| 5,544,928 | A | | 8/1996 | Mori et al. |
| 5,697,140 | A | | 12/1997 | Crotty, III et al. |
| 5,857,728 | A | * | 1/1999 | Crotty, III ................... 296/97.9 |
| 6,003,928 | A | * | 12/1999 | Curtindale ................. 296/97.9 |
| 6,021,986 | A | * | 2/2000 | Murdock ................ 248/289.11 |
| 6,113,253 | A | * | 9/2000 | Yoshii et al. ................ 362/492 |
| 6,250,708 | B1 | * | 6/2001 | Kurachi ...................... 296/97.9 |
| 6,406,087 | B2 | * | 6/2002 | Sawayanagi ................ 296/97.9 |
| 2001/0022336 | A1 | * | 9/2001 | Sawayanagi ........... 248/292.12 |
| 2003/0006624 | A1 | * | 1/2003 | De Jongh et al. .......... 296/97.9 |

FOREIGN PATENT DOCUMENTS

| EP | 0 830 965 A2 | 3/1998 |
| EP | 1 036 682 A2 | 2/2000 |
| JP | 2001-263323 | 9/2001 |

* cited by examiner

Primary Examiner—Ramon O. Ramirez
Assistant Examiner—Kofi Schulterbrandt
(74) Attorney, Agent, or Firm—Sughrue Mion, PLLC

(57) ABSTRACT

In a bracket connecting structure, hooks (8) are respectively provided on one end side and another end side of a surface of a base plate (7) of a panel-side bracket (5), the hooks are engaged with opposing peripheral edge portions of an opening (201) formed in a trim (200), so as to fix the panel-side bracket (5) to the trim, and a thin-walled portion (25) which traverses an intermediate portion of the base plate between the hook on the one end side and the hook on the other end side is provided in the base plate. Thus the base plate is made deflectable at that portion. The thin-walled portion (25) is formed by forming a U-shaped groove (23) of the base plate, and the U-shaped groove is used as a groove for passing a flat cable (20) through the groove.

12 Claims, 22 Drawing Sheets

BRACKET CONNECTING STRUCTURE

BACKGROUND OF THE INVENTION

The present invention relates to a bracket connecting structure, and more particularly to a bracket connecting structure useful at the time of fixing an auxiliary device equipped in a vehicle compartment, such as a sun visor, to a body panel.

A sun visor is disposed, for example, in the vicinity of an upper end of the windshield of an automobile on the driver's seat or the passenger's seat side. Depending on the type of the sun visor, there is a type in which the sun visor is provided with, for instance, a vanity mirror which in some cases is provided with a lamp to allow its use at night.

FIG. 18 shows an example of a bracket for mounting such a sun visor. This bracket 100 is fitted on a reverse side of a trim 200, i.e., an interior member of the vehicle body, and is fixed to a body panel (not shown) by being combined with a sun visor-side bracket (not shown). The brackets are respectively provided with connectors, and as the connectors are engaged with each other by combining both brackets, the wiring on the vehicle body side and the wiring on the sun visor side are connected.

As shown in FIG. 18, the assembling operation is performed in a procedure in which the vehicle body-side bracket 100 is fitted in advance to the trim 200, and the trim 200 in this state is fitted to an inner panel of the vehicle body. Accordingly, a plurality of hooks 101 for fitting to an opening 201 in the trim 200 are provided on the bracket 100.

These hooks 101 are L-shaped in their cross sections, and are provided at a plurality of positions on a plate surface of a base plate 102 of the bracket 100 such that their distal ends are oriented outward. As these hooks 101 are engaged with peripheral edge portions of the opening 201 of the trim 200, the bracket 100 is attached to the trim 200.

FIG. 19 shows the relationship between the hooks 101 and the opening 201 of the trim 200. The plurality of hooks 101 are formed such that opposing ones are oriented in opposite directions, the size of the opening 201 is set such that the peripheral edge of the opening 201 is located on an inner side than the position of the distal end of each hook 101, so that all the hooks 101 can engage the peripheral edge portions of the opening 201.

Conventionally, in a case where the bracket 100 is attached to the trim 200, as shown in FIG. 20, while the bracket 100 is being tilted, one of the opposing hooks 101 is first caught at a peripheral edge portion of the opening 201 in the trim 200, and a force is then applied to the other hook side as indicated by arrow N, thereby allowing the hook 101 on the other side to be pushed in and engaged with a peripheral edge portion of the opening 201 in the trim 200 by mainly utilizing the flexibility (deflection) of the trim 200. Namely, the fitting is effected by applying such a force that it does not break the hooks 101 and does not damage the trim 200.

However, since the degree to which the force is applied is difficult to adjust, the hook is liable to be broken as shown in FIG. 21, and the trim 200 is liable to be broken as shown in FIG. 22.

FIGS. 23 to 26 show another related bracket connecting structure. As shown in FIG. 23, a sun visor 501 having such a lamp has a bracket 502 at a tip of a fixing shaft 503 for fixing the sun visor 501 to the vehicle body side. This bracket 502 is fixed by being screwed down to an inner panel 504 of the vehicle body.

Hereafter, a description will be given of the structure for fixing the sun visor 501 to the inner panel 504. To obtain this structure, as shown in FIGS. 23 and 24, a wire harness 507 is first pulled out toward the vehicle compartment side through an opening 506 formed in the inner panel 504 in the vicinity of an upper end of a windshield 505, and a connector 510 attached to a tip of an electric wire 509 led out from the bracket 502 is joined to a connector 508 provided at a tip of the wire harness 507. The operation of connecting the connectors 508 and 510 is performed by the manual operation of an operator having trained skill.

Next, as shown in FIG. 24, the sun visor 501 is mounted while the joined connectors 508 and 510 and the wire harness 507 are being accommodated in a space 512 formed between the inner panel 504 and an outer panel 511 through the opening 506 formed in the inner panel 504.

Namely, as shown in FIG. 25, in a state in which the bracket 502 is being tilted while accommodating the connectors 508 and 510 and the wire harness 507 in the aforementioned space 512, a hook 518 provided on one end side of the bracket 502 is caught at a peripheral edge portion of the opening 506 in the inner panel 504. A grommet screw 513 formed on the other end side of the bracket 502 is inserted in a bracket mounting hole 514 (see FIG. 23) formed in the inner panel 504 in such a manner as to rotate the bracket 502 by using that caught portion as a fulcrum, and the bracket 502 is pushed in toward the inner panel 504 side.

Next, as shown in FIG. 26, a screw 515 is inserted in a central hole of the grommet screw 513 which is hollow cylindrical in shape, and the screw 515 is tightened. Then, a tip portion of the grommet screw 513 is pressed and expanded by the screw 515 by means of a slit 513*a* formed in the grommet screw 513 in a height wise direction from its tip portion. As one half portion 513*b* of the pressed and expanded grommet screw 513 is pressed against the peripheral edge portion of the bracket mounting hole 514, the bracket 502 is fixed to the inner panel 504.

However, since the above-described structure is arranged such that the bracket 502 is assembled while being rotated in the state in which the hook 518 has been caught beforehand, a relatively large clearance H for allowing the rotation is required between the hook 518 and the inner panel 504. Due to the presence of this clearance H, there has been a problem in that looseness or shakiness is liable to occur in the assembled state. In addition, since the hook 518 is inserted diagonally and is caught at the peripheral edge portion of the opening 506, there has been a problem in that an allowance for engagement between the hook 518 and the peripheral edge portion of the opening 506 cannot be made very large, so that it is impossible to secure high engaging strength at this portion.

SUMMARY OF THE INVENTION

The object of the invention is to provide a bracket connecting structure which makes it possible to engage the hooks of the bracket with the opening in the trim (a plate member to be attached to) easily without an excessive force, thereby making it possible to prevent incidents of the breakage of the hooks and of causing damage to the trim.

The another object of the invention is to provide a bracket connecting structure for an auxiliary device in which looseness or shakiness does not occur and which makes it possible to exhibit a positive and firm connecting force.

In order to solve the aforesaid object, the invention is characterized by having the following arrangement.

(1) A bracket comprising:
a base plate;
a pair of hooks, for engaging with opposing peripheral edge portions of an opening formed through a plate member, respectively, so that the bracket is attached to the plate member, provided at opposite ends of the base plate; and
a thin-walled portion having a thickness thinner than that of the base portion, which traverses an intermediate portion of the base plate between the pair of hooks.

(2) The bracket according to (1), wherein each of the pair of hooks has an L-shaped cross section whose distal end is oriented outwardly.

(3) The bracket according to (1), wherein the thin-walled portion is defined by a U-shaped groove for passing an electric wire therethrough.

(4) The bracket according to (3) further comprising a connector disposed midway in the U-shaped groove so that the electric wire passed though the U-shaped groove is electrically connected to the connector.

(5) The bracket according to (4), wherein the connector includes an insulation displacement terminal, the connector and the electric wire are electrically connected by subjecting an intermediate portion of the electric wire passed through the U-shaped groove to insulation displacement connection to the insulation displacement terminal.

(6) A bracket connecting structure comprising:
a first bracket including a first connector and attached to an opening formed through a panel;
a second bracket, for supporting an auxiliary device, including a second connector connectable to the first connector;
a hook, for engaging with the opening of the panel, projecting from the second bracket;
wherein after the second bracket is advanced toward the first bracket in a first direction so that the hook passes through the opening of the panel, the first and second brackets are adapted to slide in a second direction substantially perpendicular to the first direction so that the hook is engaged with the opening of the panel, and
a fastening member for connecting the first and second bracket to the panel by being passed through a connecting hole formed through the second bracket and a connecting hole formed through the panel which are aligned with each other in a state in which the hook is engaged with the opening of the panel.

(7) The bracket connecting structure according to (6), wherein the second bracket is provided with an inclined portion which is brought into sliding contact with the opening of the panel in conjunction with the advancing movement of the hook into the opening of the panel to cause the second bracket to slide in an opposite direction to the second direction.

(8) The bracket connecting structure according to (6), wherein lock portions are respectively provided on the first and second brackets for locking the first and second brackets together when the hook has positively advanced to the panel and the first bracket and the second bracket have been set in a mutually properly assembled state.

(9) The bracket connecting structure according to (6), wherein the first connector is connected to the second connector when the second bracket is advanced to the first bracket.

DETAILED DESCRIPTION OF PREFERRED EMBODIMENTS

Figure 1:
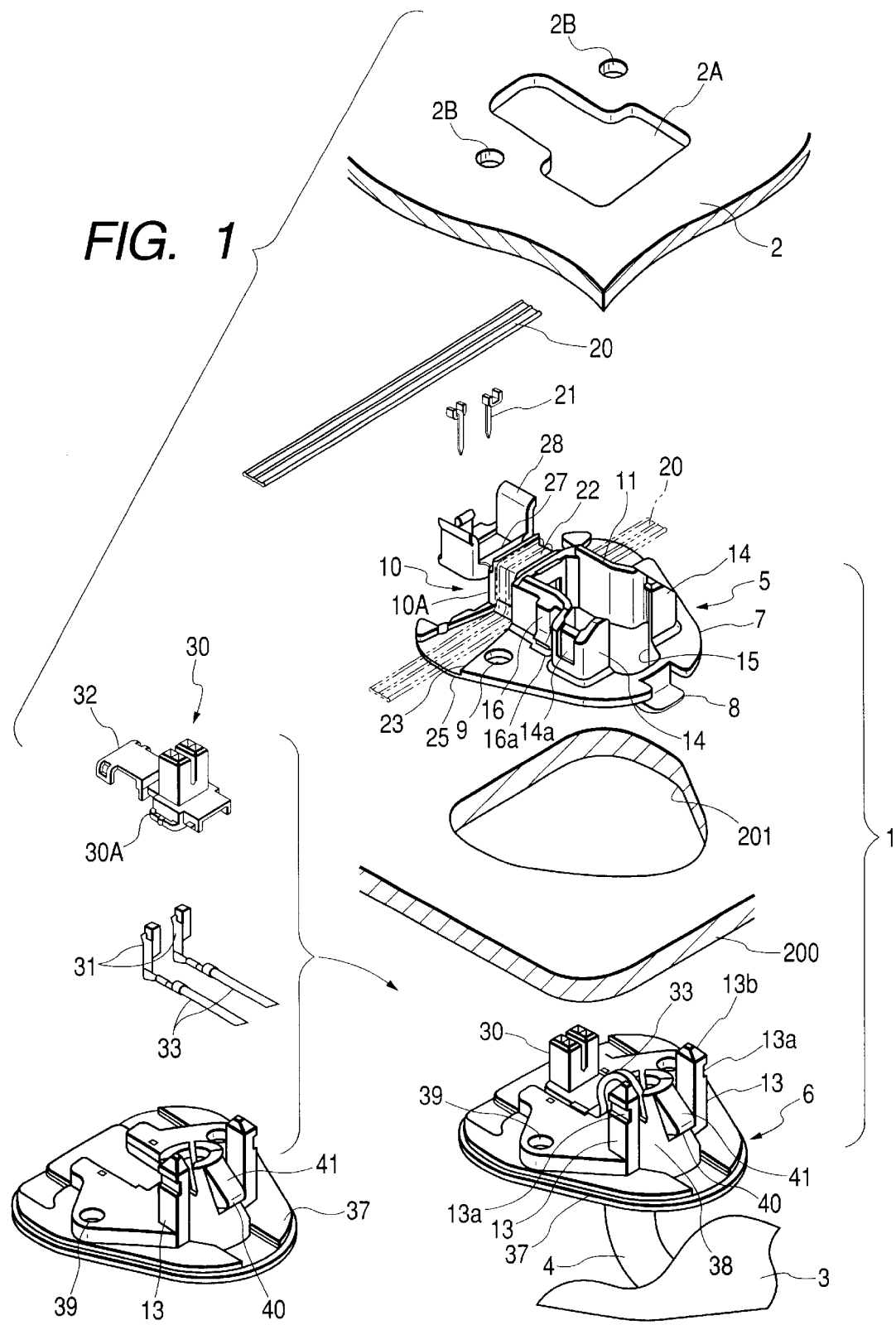
FIG. 1 is an exploded perspective view of an embodiment of the invention.

Hereafter, a detailed description will be given of details of the bracket connecting structure in accordance with the invention on the basis of an embodiment shown in the drawings.

First Embodiment

In the first embodiment, the invention is applied to the bracket connecting structure for an auxiliary device in which a sun visor (auxiliary device) disposed, for example, in the vicinity of an upper end of the windshield of an automobile on the driver's seat or the passenger's seat side is arranged to be fitted and secured easily and reliably to the vehicle body (panel) in a one-touch operation.

As shown in FIG. 1, the vehicle body-mounting bracket 1 is for securing a sun visor (auxiliary device) 3 to an inner panel 2 of the vehicle body, and is attached to a tip of a fixing shaft 4 for supporting the sun visor 3. This vehicle body-mounting bracket 1 is mainly comprised of a panel-side bracket 5 and a visor-side bracket 6 which is combined with the panel-side bracket 5.

The panel-side bracket 5 which is disposed on the reverse side of a trim (vehicle compartment ceiling plate=plate member to be attached to) 200 has a substantially triangular base plate 7 as a base portion. Here, of the three apexes of the triangular base plate 7, the side where one apex is located will be referred to as "one end side" and the side where the remaining two apices are located as the "other end side" for convenience's sake. In addition, in a case where a bisector of the angle of an apex on the one end side is referred to as a center line of the bracket, the panel-side bracket 5 is formed in a substantially bilaterally symmetric shape with that center line of the bracket as a reference.

Figure 2:
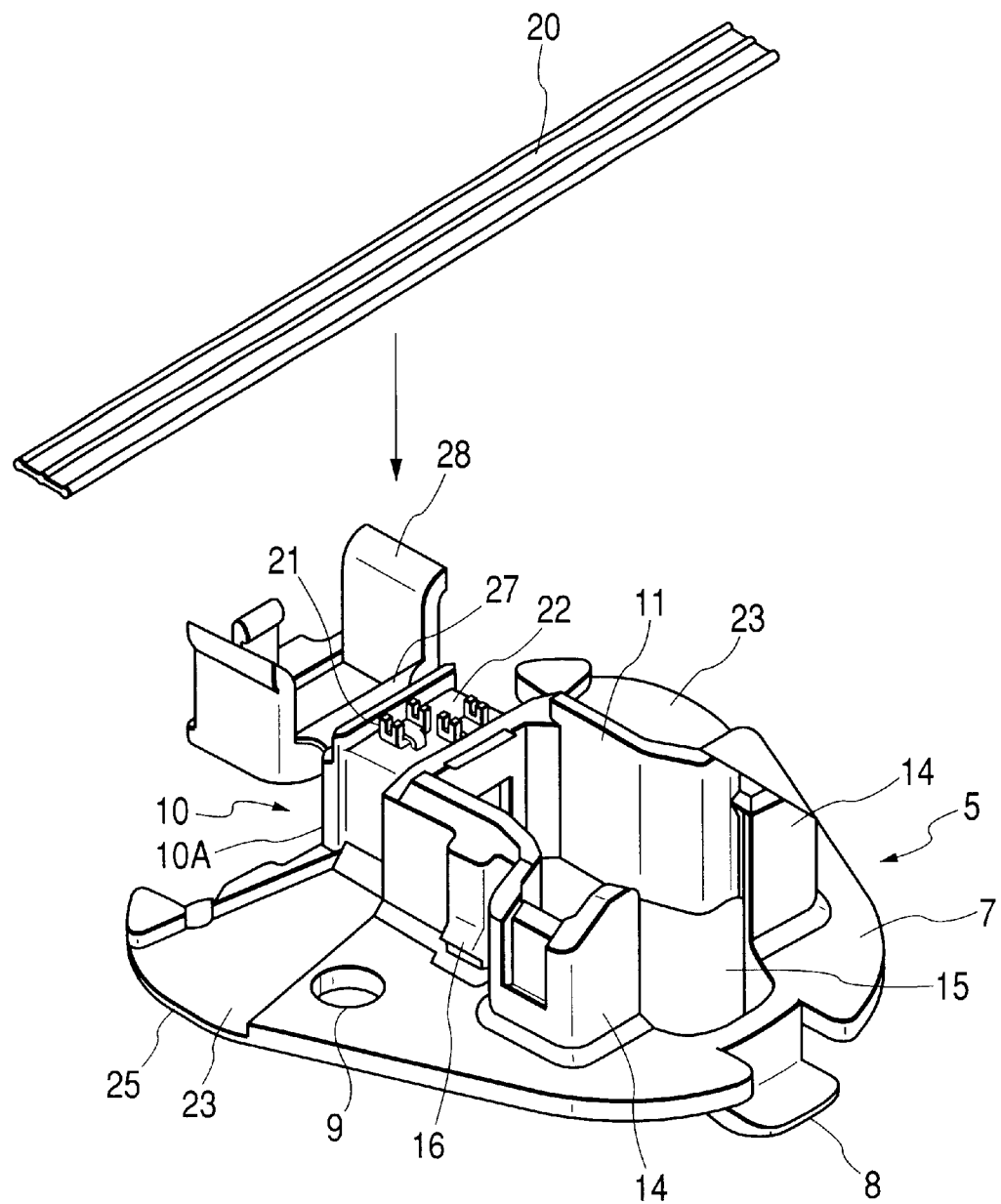
FIG. 2 is an enlarged perspective view of a panel-side bracket in the embodiment.
Figure 3:
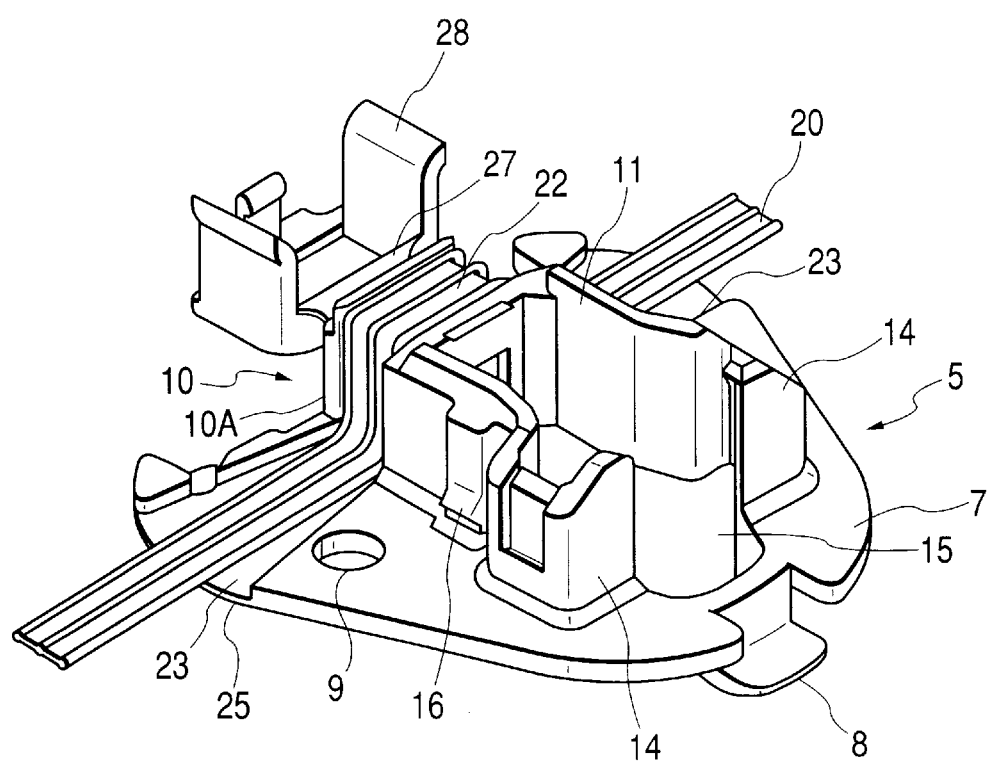
FIG. 3 is a perspective view illustrating a state in which a flat cable is subjected to insulation displacement connection to a female connector of the panel-side bracket shown in FIG. 2.
Figure 4:
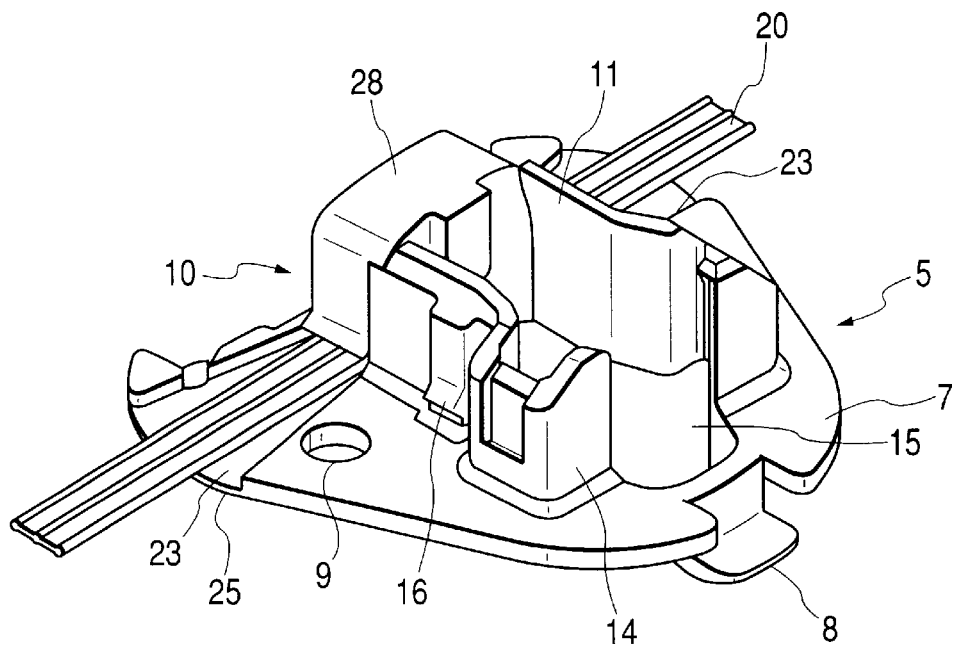
FIG. 4 is a perspective view illustrating a state in which a cover is fitted after the insulation displacement connection in FIG. 3.
Figure 5:
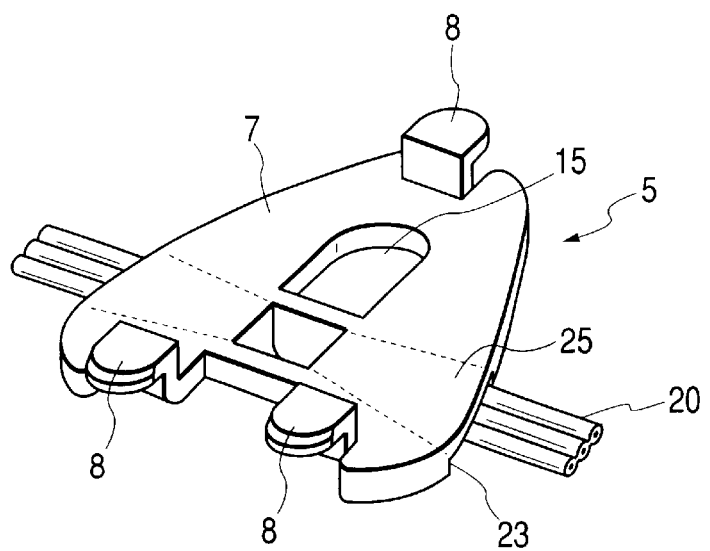
FIG. 5 is an enlarged perspective view taken from the reverse side of the panel-side bracket in the embodiment.

FIGS. 2 to 4 show the details of the panel-side bracket 5, and FIG. 5 shows the construction of the reverse surface side of the bracket 5.

As shown in FIG. 5, three outwardly oriented hooks 8 for engaging peripheral edge portions of an opening 201 in the trim 200 are provided at three positions corresponding to the respective apices on the lower surface of the base plate 7 of the bracket 5. Of the three hooks 8, one is located on the one end side of the bracket 5, while the other two are located on the other end side of the bracket 5. Each hook 8 projects from the lower surface of the base plate 7 in an L-shape, and the tip of each outwardly oriented hook 8 is located on the inner side than the outer peripheral contour line of the base plate 7. Further, a bilateral pair of screw connecting holes 9 are formed in the base plate 7.

A housing 10A of a female connector (first connector) 10 and a pair of opposing side walls 11 continuing from the housing 10A of the female connector 10 are provided projectingly on an upper surface of the base plate 7. A pair of square tube-shaped lock portions 14 for locking with a pair of lock projections (lock portions) 13 provided projectingly on the visor-side bracket 6 are further provided projectingly in such a manner as to continue from the opposing side walls 11. The housing 10A of the female connector 10 is formed at a position close to the other end of the bracket 5, the lock portions 14 are formed at a position close to the one end of the bracket 5, and the side walls 11 are formed at an intermediate position in such a form as to connect them.

A central opening 15 is provided in a central portion of the base plate 7 at a position offset from the housing 10A of the female connector 10. The sidewalls 11 and the lock portions 14 are disposed in face-to-face relation with the central opening 15 located therebetween. The square tube-shaped lock portion 14 has a groove shape formed by three side walls with a side wall on the central opening 15 side removed, and has a flexible lock arm 14a with an engaging pawl on the side wall located away from the central opening 15 side. A lower end face of this lock portion 14 is open so as to be able to receive the lock projection 13 provided projectingly on the visor-side bracket 6.

An engaging portion 16 for temporarily engaging the inner panel 2 (for disengaging the connectors) is provided on an outer surface side of each side wall 11. This engaging portion 16 is formed as a projecting wall of a predetermined width, such that an engaging groove 16a having a width corresponding to the thickness of the inner panel 2 is secured between the engaging portion 16 and the upper surface of the base plate 7.

As shown in FIG. 2, a make terminal 21, which is electrically connected to a vehicle body-side flat cable (electric wire) 20 that is wired in a through state, is accommodated in the housing 10A of the female connector 10. As a male connector 30 mounted on the visor-side bracket 6 is inserted through an opening at the lower end of the female connector 10, a female terminal 31 on the male connector 30 side and the male terminal 21 can be electrically connected. This male terminal 21 is constituted by an insulation displacement terminal capable of effecting the insulation displacement connection (through connection) with respect to a longitudinally intermediate portion of the flat cable 20 routed in the through state.

A U-shaped groove 22 for accommodating and guiding the flat cable 20 subjected to insulation displacement connection with the male terminal 21 is provided in outer surfaces (an upper surface and side surfaces) of the housing 10A of the female connector 10. A pair of U-shaped grooves 23 for accommodating and guiding the flat cable 20 are also provided on the upper surface of the base plate 7 on both sides of the housing 10A in such a manner as to continue from the U-shaped groove 22. These U-shaped grooves 22 and 23 are shallow, wide grooves of such a depth as to be capable of accommodating the flat cable 20, and traverse an intermediate portion of the bracket 5 between the hook 8 on one end side and the hooks 8 on the other end side in a transverse direction (a direction perpendicular to the aforementioned center line of the bracket). However, since the housing 10A of the female connector 10 is located close to the other end of the bracket 5, these U-shaped grooves 22 and 23 are located in the vicinities of the roots of the hooks 8 on the other end side. Since these U-shaped grooves 22 and 23, particularly the U-shaped grooves 23, are formed in the surface of the base plate 7 of the bracket 5, these portions are formed as thin-walled portions 25, so that the base plate 7 is easily deflectable at that portion. Incidentally, the U-shaped grooves 23 in the upper surface of the base plate 7 are each formed in a fan shape which becomes wider from the housing 10A side of the female connector 10 toward the outer peripheral edge of the base plate 7.

As shown in FIGS. 3 and 4, a cover 28 is provided so as to continue from an upper end of the housing 10A of the female connector 10 by means of a hinge 27. As this cover 28 is fitted over and retained on the housing 10A, the male terminal 21 accommodated in the female connector 10 and the flat cable 20 connected thereto can be held so as not to come off.

Referring back to FIG. 1, an opening 2A, into which the female connector 10, the lock portions 14, the engaging portions 16, and the like are inserted, is provided in the inner panel 2 on which the panel-side bracket 5 having the above-described construction is disposed. The opening 2A has a wide portion into which the lock portions 14 and the engaging portions 16 are inserted, as well as a narrow portion into which the female connector 10 is inserted. As the engaging portions 16 inserted through the wide portion are slid toward the narrow portion side, peripheral edge portions of the narrow portion of the opening are adapted to engage the engaging grooves 16a of the engaging portions 16. This engaging structure is designed to hold the panel-side bracket 5 onto the inner panel 2 side to ensure that an excessive force will not be applied to the trim 200. In addition, a pair of mounting holes 2B are provided in the inner panel 2 at positions corresponding to the screw connecting holes 9 in the panel-side bracket 5.

Next, a description will be given of the structure of the visor-side bracket 6 which is assembled onto the panel-side bracket 5 from the obverse surface side (vehicle compartment side) of the trim 200.

The visor-side bracket 6 is disposed on a side of the trim 200, which is an interior member that is fixed to the inner panel 2, away from its side where the panel-side bracket 5 is disposed, and the visor-side bracket 6 is fixed to the inner panel 2. This visor-side bracket 6 has a substantially triangular base plate 37 of a size similar to that of the base plate 7 of the panel-side bracket 5 as a base portion. In the case of this bracket 6 as well, the way in which one end side and the other end side are referred to as such is the same as the case of the bracket 5.

A shaft holding portion 38 (see FIG. 7) for holding a peripheral side portion of a tip portion of the fixing shaft 4 of the sun visor 3 is provided projectingly on the upper surface of the base plate 37 of this bracket 6. The shaft holding portion 38 is formed as a substantially hollow cylindrical member having in its center a shaft holding hole through which the fixing shaft 4 is inserted. The shaft holding portion 38 is formed in such a manner as to be capable of being passed through the central opening 15 in the panel-side bracket 5 and of advancing into the opening 2A of the inner panel 2.

A hook 40, which advances into the opening 2A of the inner panel 2 and engages a peripheral edge portion of the opening 2A, is formed on a front surface (a side of the visor-side bracket 6 on the one end side) of this hollow cylindrical shaft holding portion 38. An inclined surface (inclined portion) 41 which is inclined toward the front side (the one end side of the bracket 6) is provided on a distal end of the hook 40. The arrangement provided is such that when the hook 40 advances into the opening 2A of the inner panel 2, the hook 40 is brought into sliding contact with the peripheral edge portion of the opening 2A in conjunction with its advancing motion, thereby causing the bracket 6 to be slid in the opposite direction to the hook engaging direction.

The male connector 30 accommodating the female terminal 31 is fitted on the upper surface of the visor-side bracket 6. A terminal of a visor-side electric wire 33, which is led out from an end of the fixing shaft 4 inside the shaft holding portion 38, is connected to the female terminal 31.

The male connector 30 is structured as an assembly in which the female terminal 31 is accommodated in its housing 30A from below, and a lower surface of the housing 30A is closed by a cover 32. As the male connector 30 in this state is slidingly engaged with an engaging groove in the upper surface of the bracket 6, the male connector 30 is provided uprightly on the upper surface of the base plate 37. Further, the male connector 30 is capable of engaging the female connector 10 on the panel-side bracket 5.

A pair of screw connecting holes 39 for screwing to the inner panel 2 are provided on the base plate 37 of the visor-side bracket 6. These screw connecting holes 39 correspond to the positions of the screw connecting holes 9 in the panel-side bracket 5 and the mounting holes 2B in the inner panel 2, and are located at positions closer to the other end side of the bracket 6 than the aforementioned hook 40.

The pair of lock projections (lock portions) 13 projecting upward are respectively formed on left and right sides of the shaft holding portion 38 on the base plate 37. These lock projections 13 are set to be higher than the male connector 30, and is arranged to be inserted into the square tube-shaped lock portions 14 formed on the above-described panel-side bracket 5 prior to the engagement between the male connector 30 and the female connector 10.

An engaging groove 13a, with which the engaging pawl of the lock arm 14a of the square tube-shaped lock portion 14 is engaged, is formed on a side surface of an upper portion of each lock projection 13. In addition, a guide portion 13b which is substantially pyramidal (quadrangular pyramid-shaped) or substantially conical in shape is formed at an apex of each lock projection 13 to facilitate the insertion of the lock projection 13 into the lock portion 14. Thus the positioning of the visor-side bracket 6 and the panel-side bracket 5 is facilitated.

Next, a description will be given of the structure for connecting the above-described brackets 5 and 6 to the inner panel 2.

To fit the panel-side bracket 5 and the visor-side bracket 6 to the inner panel 2, the panel-side bracket 5 is first disposed in advance on the reverse side (vehicle outer side) of the trim 200, and the hooks 8 are engaged with the peripheral edge portions of the opening 201 in the trim 200, thereby attaching the panel-side bracket 5 to the trim 200. This attaching operation of the panel-side bracket 5 is performed before attaching the trim 200 to the inner panel 2.

When the hooks 9 are engaged with the trim 200, the engagement is effected while the bracket 5 is being bent at its thin-walled portions 25.

Figure 6A:
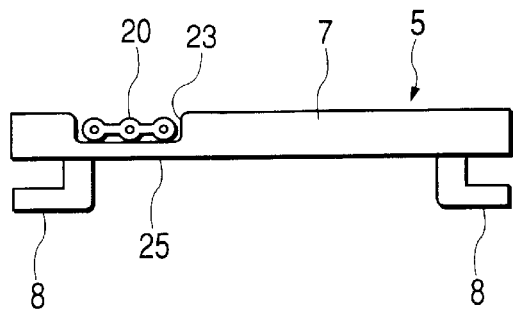
FIGS. 6A to 6D are diagrams illustrating the procedure in a case where the panel-side bracket is attached to a trim in the embodiment.
Figure 6B:
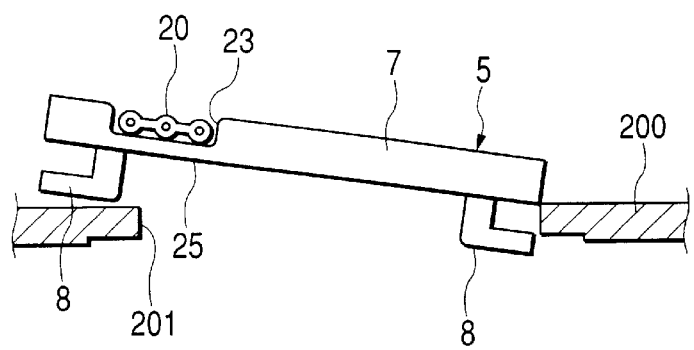
Figure 6C:
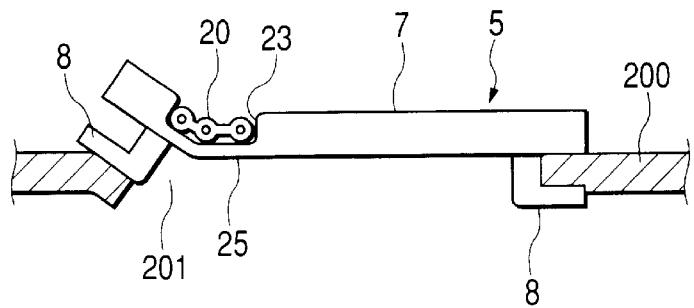
Figure 6D:
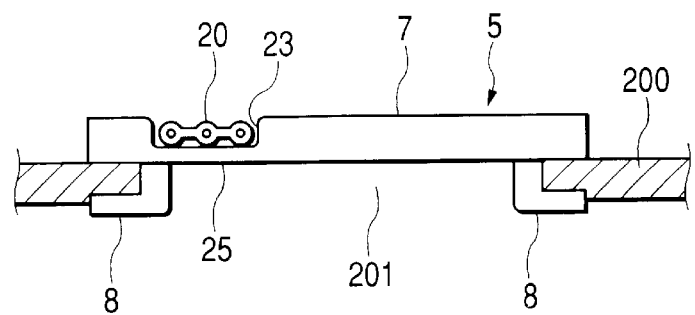

FIGS. 6A to 6D are simplified drawings illustrating the procedure at that time. First, the bracket 5 shown in FIG. 6A is opposed to the opening 201 of the trim 200 as shown in FIG. 6B, and the hook 8 located on the one end side, for instance, is caught beforehand at the peripheral edge portion of the opening 201 in the trim 200. Next, the bracket 5 is pressed against the trim 200. Then, the bracket 5 is deflected at the position of the thin-walled portions 25 as shown in FIG. 6C, and the distance between the hooks 8 at the other end side and the hook 8 at the one end side is slightly shortened. As a result, the hooks 8 at the other end side pass the peripheral edge portions of the opening 201, reach the opposite side of the trim 200, and engage the peripheral edge portions of the opening 201. Accordingly, it becomes possible to cause the hooks 8 to engage the trim 200 not with an excessive force but with a force which is not too strong. Thus, the attaching operation can be effected simply, and it becomes possible to prevent the breakage of the peripheral edge portions of the opening 201 of the trim 200 and the damage to the hooks 8. Even if the flat cable 20 is accommodated beforehand in the U-shaped grooves 22 and 23, since the flat cable 20 itself is flexible, it is possible to obtain a similar effect.

After the panel-side bracket 5 is attached to the reverse surface side of the trim 200, the trim 200 is assembled onto the inner panel 2. At that time, as shown in FIG. 3, the male terminal 21 of the female connector 10 and the flat cable 20 drawn out from the opening 2A of the inner panel 2 are subjected to insulation displacement connection in advance. Then the cover 28 is fitted over the housing 10A of the female connector 10, thereby completing the female connector 10, as shown in FIG. 4.

At this time, since the flat cable 20 is accommodated in the U-shaped grooves 22 and 23 formed in the surface of the housing 10A of the female connector 10 and the surface of the base plate 7, the flat cable 20 is held in a proper position so as not to be positionally offset. In addition, since the longitudinally intermediate portion of the flat cable 20 is subjected to through connection to the female connector 10, it is possible to simplify the routing of the flat cable in the ceiling portion of the vehicle. This aspect will be described later.

It should be noted that there are cases where the electrical connection of the flat cable 20 and the female connector 10 is effected before attaching the panel-side bracket 5 to the trim 200. Even in the case where the flat cable 20 is connected beforehand to the female connector 10, the bracket 5 is easily deflectable at the thin-walled portions 25 of the base plate 7, so that when the bracket 5 is attached to the trim 200 later, it is possible to engage the hooks 8 with the peripheral edge portions of the opening 201 of the trim 200 without applying a large force.

Figure 7:
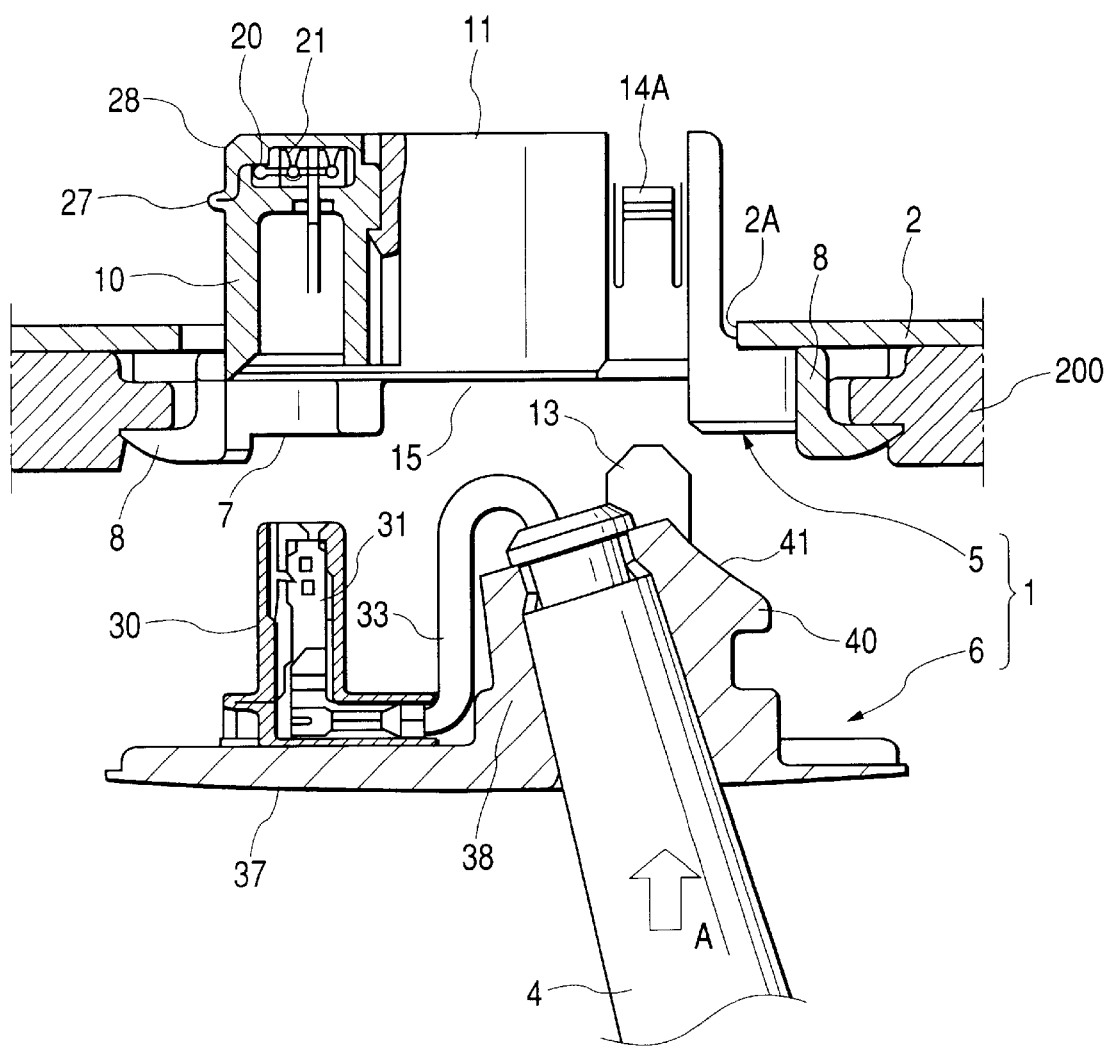
FIG. 7 is an explanatory diagram of the embodiment and is a cross-sectional view illustrating a state in which a visor-side bracket is assembled onto the panel-side bracket.

When the trim 200 is attached to the inner panel 2, the projecting portions on the panel-side bracket 5, i.e., the female connector 10, the lock portions 14, the side walls 11, and the like, are inserted into the opening 2A of the inner panel 2 as shown in FIG. 7.

In this state, the panel-side bracket 5 is disposed on the underside of the inner panel 2 (on the front surface in the direction in which the visor-side bracket 6 is assembled). In this state, the male connector 30, the lock projections 13, and the shaft holding portion 38 of the visor-side bracket 6 are respectively made to oppose the female connector 10, the lock portions 14, and the central opening 15 of the panel-side bracket 5, and the visor-side bracket 6 is assembled onto the panel-side bracket 5 from the lower surface side.

Namely, as shown in FIG. 7, the visor-side bracket 6 is pressed against the panel-side bracket 5 straightly in the direction indicated by arrow A. Then, the highest lock projections 13 of the visor-side bracket 6 first enter the square tube-shaped lock projections 14 of the panel-side bracket 5, and the male connector 30 then begins to engage the female connector 10. At this time, the pyramidal guide portions 13b are disposed at the tips of the lock projections 13, and the lock projections 13 are guided into the square tube-shaped lock projections 14 before the engagement of the connectors 10 and 30, so that the connectors 10 and 30 and the brackets 5 and 6 are positioned. Consequently, the connection of the male connector 30 and the female connector 10 is effected positively and easily.

Figure 8:
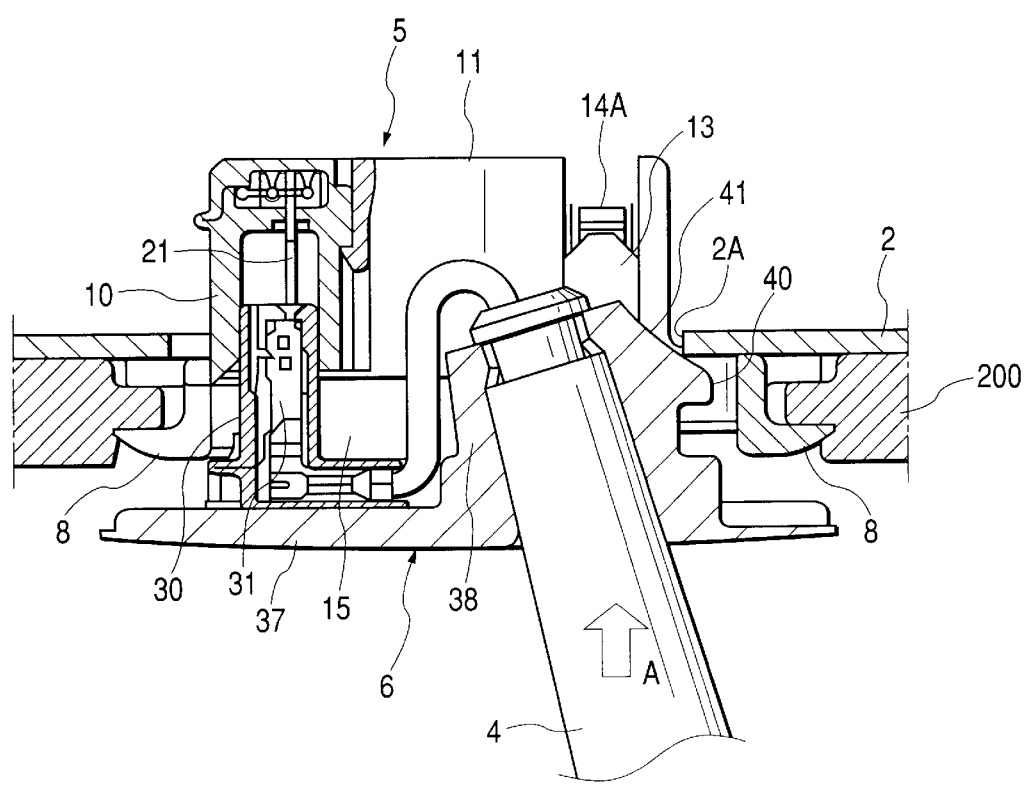
FIG. 8 is a cross-sectional view illustrating a state continuing from the state shown in FIG. 7.
Figure 9:
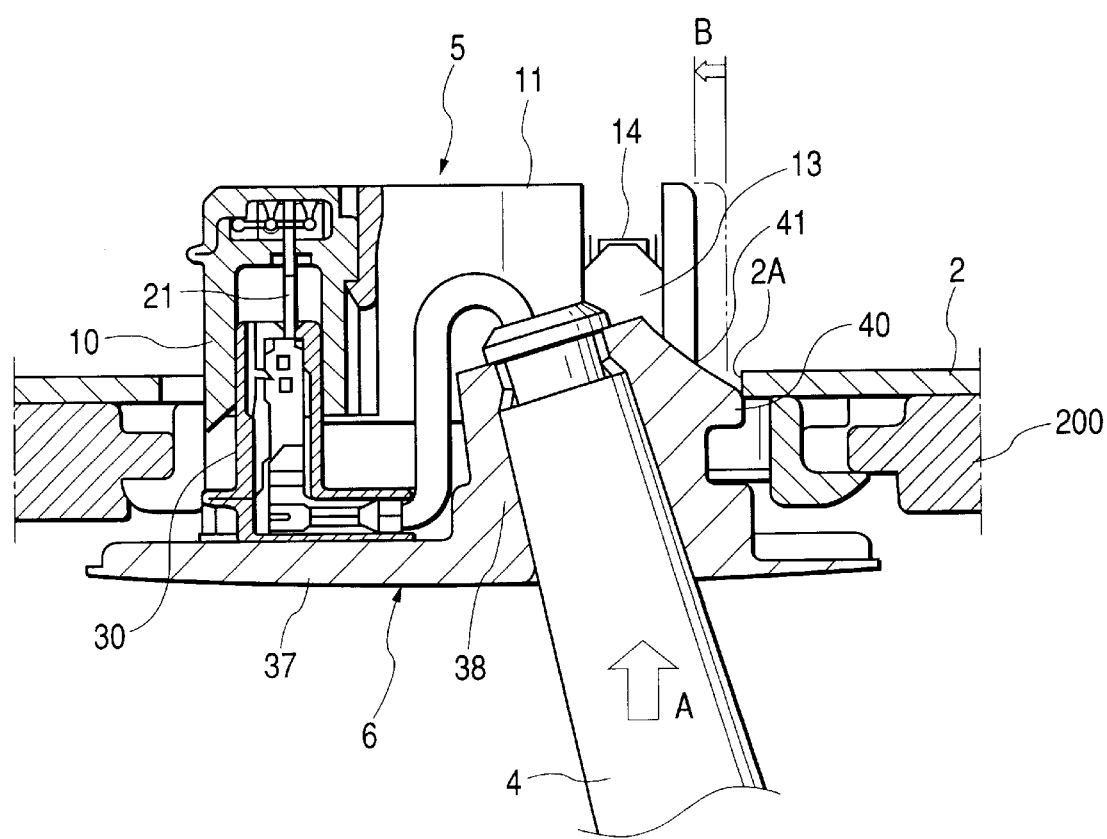
FIG. 9 is a cross-sectional view illustrating a state continuing from the state shown in FIG. 8.

As shown in FIG. 8, when the engagement of the female connector 10 and the male connector 30 begins, the inclined surface 41 at the distal end of the hook 40 of the base plate 6 abuts against the peripheral edge portion of the opening 2A of the inner panel 2. As the visor-side bracket 6 is further pressed against the panel-side bracket 5 side, the two brackets 5 and 6 slide in the opposite direction (the direction of arrow B) to the hook engaging direction due to the action of the inclined surface 41, as shown in FIG. 9. Then, as the brackets 5 and 6 thus slide, the inclined surface 41 of the hook 40 is dislocated from the peripheral edge portion of the opening 2 of the inner panel 2, and the hook 40 passes the opening 2 and advances to the reverse surface side of the inner panel 2. Concurrently, the male connector 30 engages the female connector 10, and the lock projections 13 are fitted in the lock portions 14.

The fact that the connectors 10 and 30 are properly engaged and the brackets 5 and 6 are positively joined can be confirmed by the locking sound occurring when the engaging pawls of the lock arms 14a of the lock portions 14 are engaged in the engaging grooves 13s of the lock projections 13.

Figure 10:
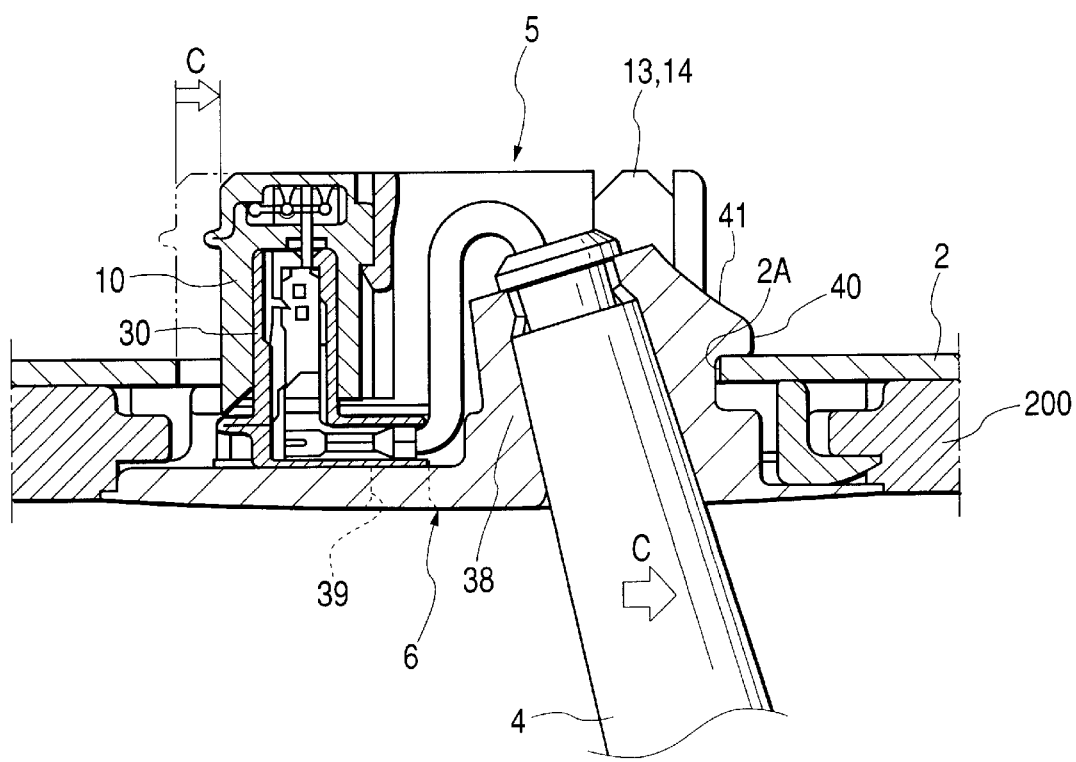
FIG. 10 is a cross-sectional view illustrating a state in which the assembly of the visor-side bracket onto the panel-side bracket has been completed as a stage following that of FIG. 9.

After confirming by the locking sound that this state has been reached, as shown in FIG. 10, the visor-side bracket 6 and the panel-side bracket 5 are slid in the hook engaging direction indicated by arrow C in the drawing, thereby engaging the hook 40 with the peripheral edge portion of the opening 2A of the inner panel 2.

At this time, since the screw connecting holes 9 and 39 of the brackets 5 and 6 are formed in advance so as to be aligned with the mounting holes 2B on the inner panel 2 side in the state in which the hook 40 is properly engaged, by merely sliding the brackets 5 and 6 so as to align the screw connecting holes 9 and 39 with the mounting holes 2B, it is possible to positively engage the hook 40 with the peripheral edge portion of the opening 2A in the inner panel 2.

After temporary engagement is thus completed by the hook 40, screws (fastening members) are inserted and tightened in the positionally aligned screw connecting holes 9 and 39 and mounting holes 2B, thereby completing the mounting of the sun visor 3.

In the state in which the mounting has thus been completed, since the panel-side bracket 5 is clamped by the inner panel 2 and the visor-side bracket 6 which are rigid, the effect of the lack of strength due to the provision of the thin-walled portions 25 presents no problem.

When there has arisen a need to detach the sun visor 3 from the above-described mounted state, the screws are pulled out and the two brackets 5 and 6 are slid in the opposite direction to the hook engaging direction to disengage the hook 40 and the inner panel 2, and the visor-side bracket 6 is pulled downward in that state. Then, the lock projections 13 and the lock portions 14 are disengaged (since this lock is temporary, the lock can be canceled if the visor-side bracket 6 is pulled strongly), and the male connector 30 comes off the female connector 10. At that time, at the point of time when the brackets 5 and 6 have slid in the opposite direction to the hook engaging direction, the engaging portions 16 of the panel-side bracket 5 engage the edges of the narrow portion of the opening 2A of the inner panel 2, and the panel-side bracket 5 is held by the inner panel 2. Therefore, it is possible to disengage the visor-side bracket 6 from the panel-side bracket 5 without applying an excess force to the trim 200.

In the above-described connecting structure, since the panel-side bracket 5 is provided with the thin-walled portions 25 and made deflectable at those portions, the hooks 8 of the panel-side bracket 5 can be easily engaged with the opposing peripheral edge portions of the opening 201 in the trim 200 without applying an excessive force. Accordingly, there is no risk of breaking the peripheral edge portions of the opening 201 in the trim 200 and breaking the hooks 8, and the assembling operation is facilitated.

Since the thin-walled portions 25 for making the panel-side bracket 5 deflectable are formed by the U-shaped grooves 22 and 23 for accommodating the flat cable 20, as compared with the case where the thin-walled portions and the wire accommodating grooves are provided separately, the bracket 5 does not become large, and the construction of the bracket 5 is simplified.

Figure 11:
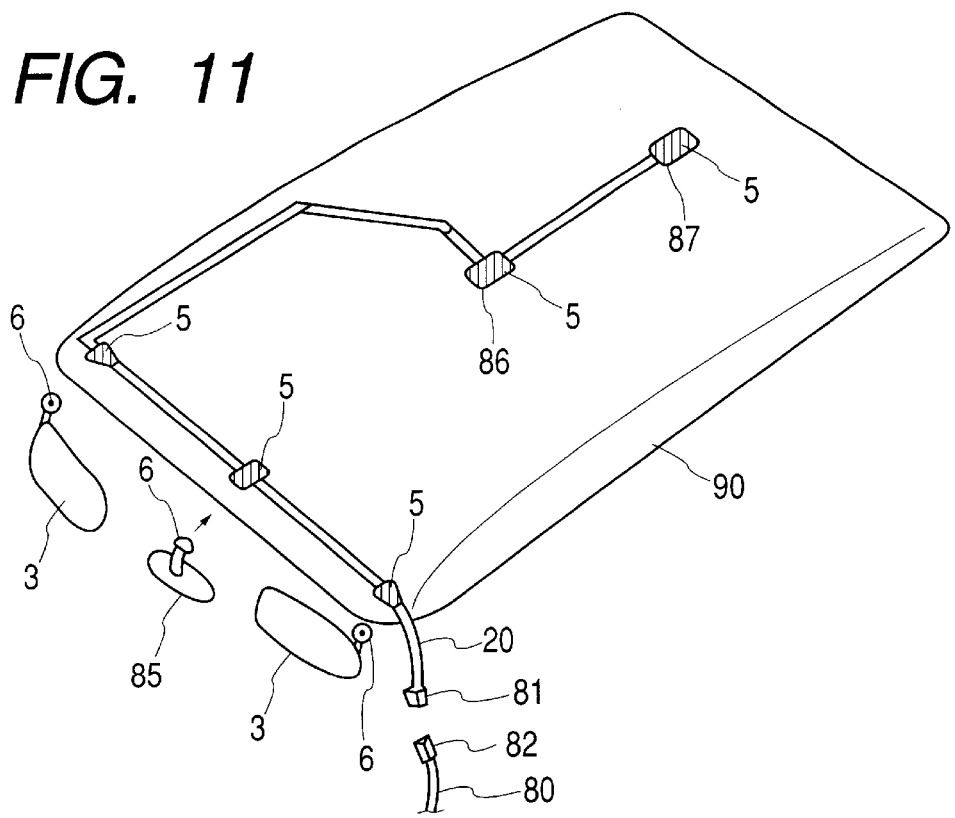
FIG. 11 is an explanatory diagram of an example of application of the embodiment and is a perspective view illustrating a state in which the flat cable is routed in a ceiling portion of a vehicle while the flat cable is subjected to through connection.

Since the intermediate portion of the flat cable 20 is subjected to insulation displacement connection to the male terminal 21 of the female connector 10 provided midway between the U-shaped grooves 23, in a case where a multiplicity of auxiliary devices (e.g., the sun visor 3 and interior lamps 85, 86, 87) are arranged on a ceiling portion 90 of the vehicle, as shown in FIG. 11, by routing a single flat cable 20 it is possible to effect the through connection of the plurality of auxiliary devices to the flat cable 20, thereby making it possible to simplify the routing of the cable. In this case as well, it is possible to use the above-described combination of the panel-side bracket 5 and the visor-side bracket 6 in the mounting of the auxiliary devices. Incidentally, reference numeral 80 in the drawing denotes a vehicle body-side cable which is adapted to be connected to the flat cable 20 by means of connectors 81 and 82.

Figure 12:
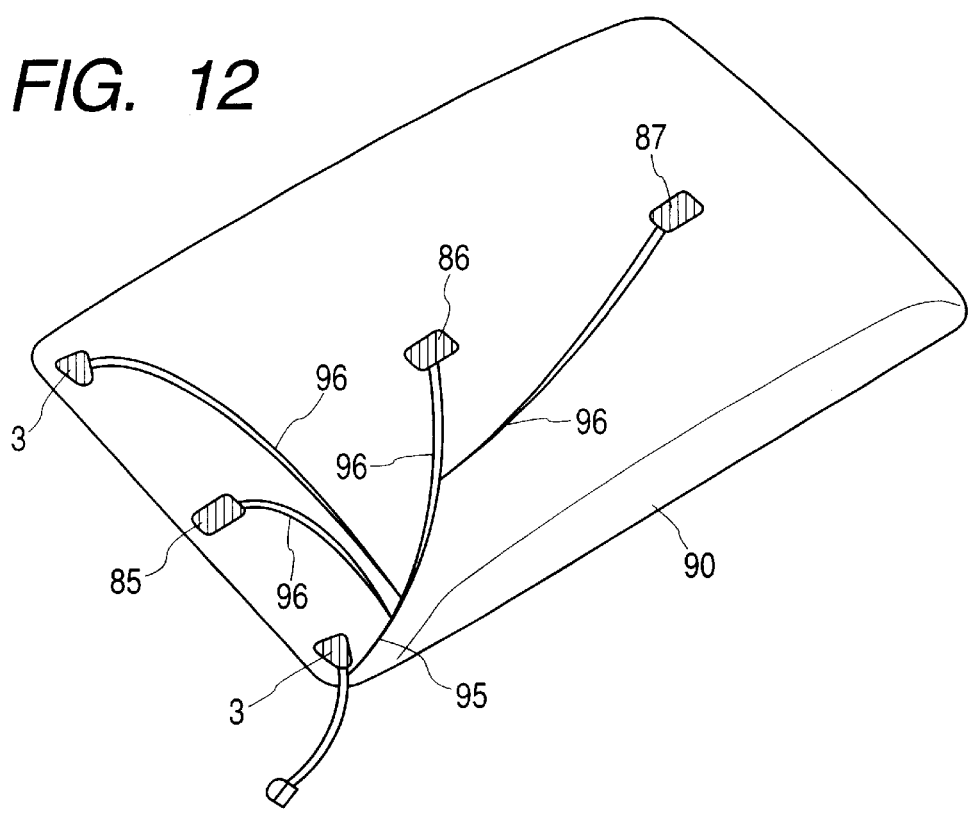
FIG. 12 is diagram shown as a comparative example for FIG. 11, and is a perspective view illustrating a state in which a wire harness is routed in the ceiling portion of the vehicle.

FIG. 12 shows a state of the conventional wiring in the vehicle ceiling portion 90 by way of a comparative example. Conventionally, the routing is effected by using a wire harness 95, and terminals of its branch lines 96 are connected to various auxiliary devices. Accordingly, since the connection is not through connection, the amount of wire routed increases, so that the cost increases.

In contrast, in the structure of the above-described embodiment, since a plurality of auxiliary devices can be through connected to the single flat cable 20, the amount of wire routed can be small, thereby making it possible to attain a cost reduction.

In the structure of the above-described embodiment, the arrangement provided is such that by sliding the panel-side bracket 5 and the visor-side bracket 6 along the inner panel 2, the hook 40 of the visor-side bracket 6 is engaged with the peripheral edge portion of the opening 2A in the inner panel 2. Therefore, the clearance between the hook 40 and the inner panel 2 in the assembled state can be set to a minimum, and an allowance for the engagement of the hook 40 and the inner panel 2 can be set to be relatively large. Accordingly, the engagement with the inner panel 2 using the hook 40 can be effected positively with high strength in a state in which the looseness or shakiness is nil, so that the sun visor 3 can be secured to the inner panel 2 firmly and positively by means of the brackets 5 and 6.

Since the hook 40 can be properly engaged with the inner panel 2 by merely sliding the brackets 5 and 6 and positioning the screw connecting holes 9 and 39 with respect to the mounting holes 2B on the inner panel 2 side, the positioning operation before screwing down is facilitated, thereby improving the operating efficiency.

By merely effecting the operation of assembling the visor-side bracket 6 onto the panel-side bracket 5, the brackets 5 and 6 automatically slide in the opposite direction to the hook engaging direction by virtue of the action of the inclined surface 41 at the distal end of the hook 40, thereby guiding the advance of the hook 40 into the opening 2A of the inner panel 2. Therefore, the sliding allowance for engaging the hook 40 can be secured without particularly confirming visually the positional relationship between the hook 40 and the opening 2A of the inner panel side, i.e., by merely pushing the visor-side bracket 6 onto the panel-side bracket 5. Accordingly, the hook 40 can be subsequently engaged properly with the inner panel 2 by merely sliding the brackets 5 and 6 in the hook engaging direction.

Since the hook 40 can be positively engaged with the peripheral edge portion of the opening 2A in the inner panel 2 by merely sliding the brackets 5 and 6 in the hook engaging direction after the confirmation of the locking sound of the lock projections 13 and the lock portions 14, it is possible to prevent erroneous assembling in a state in which the brackets 5 and 6 have not been properly effected. Namely, in a case where the brackets 5 and 6 are slid in the hook engaging direction in the state in which the lock has not been confirmed (i.e., in the state in which the two brackets have not been assembled properly), the movement is effected in a state in which the hook 40 has not positively reached the reverse surface side of the inner panel 2, so that the hook 40 cannot be properly engaged with the inner panel 2. Additionally, because the hook 40 cannot be properly engaged with the inner panel 2, the positions of the screw connecting holes 9 and 39 on the brackets 5 and 6 side and the mounting holes 2B on the inner panel 2 side cannot be aligned with each other, so that screwing down cannot be effected. Accordingly, it is thereby possible to prevent the erroneous assembling in the state in which the assembling of the brackets 5 and 6 has not been effected properly.

Although in the above-described embodiment a description has been given of the case in which the sun visor 3 is mounted on the inner panel 2 by using the visor-side bracket 6 after attaching the trim 200 to the inner panel 2, the trim 200 may be assembled onto the inner panel 2 after the visor-side bracket 6 is set in advance in a state of being temporarily fixed to the trim 200 (a roof module state). In such a case as well, when the trim 200 is assembled onto the inner panel 2, the brackets 5 and 6 similarly slide in the opposite direction to the hook engaging direction by virtue of the action of the inclined surface 41 of the hook 40. Accordingly, if the brackets 5 and 6 are subsequently slid so as to align the screw connecting holes 9 and 39 with the mounting holes 2B of the inner panel 2, the proper engagement of the hook 40 is completed.

The brackets 5 and 6 can be attached by using screw grommets (fastening members) instead of merely fastening with the screws. In that case, it suffices if a bracket casing is prepared separately in advance, and screw grommets (fastening members) provided projectingly on the casing are inserted into the screw connecting holes 9 and 39 and the mounting holes 2B by fitting this bracket casing from the lower surface side of the visor-side bracket 6. Subsequently, the brackets 5 and 6 can be fastened to the inner panel 2 by tightening the screws into the screw grommets.

Although a description has been given above of the embodiment, the invention is not limited to the same, and various modifications incidental to the gist of the arrangement of the invention are possible. For example, although the sun visor is used as the auxiliary device in the above-described embodiment, the invention is applicable to other auxiliary devices such as interior lamps.

Second Embodiment

In the second embodiment, the invention is applied to the bracket connecting structure for an auxiliary device in which a sun visor (auxiliary device) disposed, for example, in the vicinity of an upper end of the windshield of an automobile on the driver's seat or the passenger's seat side is arranged to be fitted and secured easily and reliably to the vehicle body (panel) in a one-touch operation.

Figure 13:
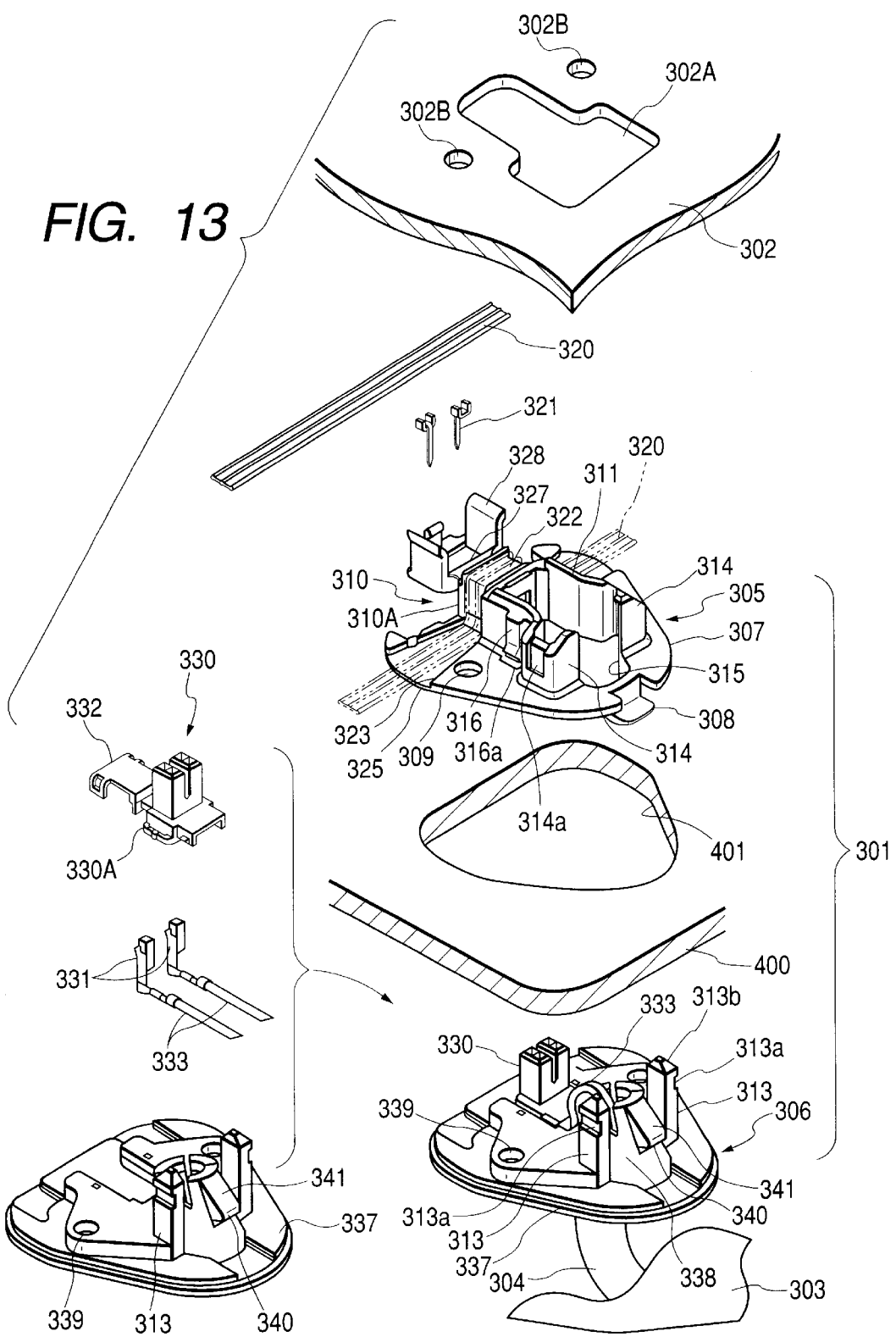
FIG. 13 is an exploded perspective view of a second embodiment of the invention.

As shown in FIG. 13, the vehicle body-mounting bracket 301 is for securing a sun visor (auxiliary device) 303 to an inner panel 302 of the vehicle body, and is attached to a tip of a fixing shaft 304 for supporting the sun visor 303. This vehicle body-mounting bracket 301 is mainly comprised of a panel-side bracket 305 (first bracket) and a visor-side bracket 306 (second bracket) which is combined with the panel-side bracket 305.

The panel-side bracket 305 which is disposed on the reverse side of a trim (vehicle compartment ceiling plate= plate member to be attached to) 400 has a substantially triangular base plate 307 as a base portion. Here, of the three apexes of the triangular base plate 307, the side where one apex is located will be referred to as "one end side" and the side where the remaining two apices are located as the "other end side" for convenience's sake. In addition, in a case where a bisector of the angle of an apex on the one end side is referred to as a center line of the bracket, the panel-side bracket 305 is formed in a substantially bilaterally symmetric shape with that center line of the bracket as a reference.

Three outwardly oriented hooks 308 for engaging peripheral edge portions of an opening 401 in the trim 400 are provided at three positions corresponding to the respective apices on the lower surface of the base plate 307. Of the three hooks 308, one is located on the one end side of the bracket 305, while the other two are located on the other end side of the bracket 305. Each hook 308 projects from the lower surface of the base plate 307 in an L-shape, and the tip of each outwardly oriented hook 308 is located on the inner side than the outer peripheral contour line of the base plate 307. Further, a bilateral pair of screw connecting holes 309 are formed in the base plate 307.

A housing 310A of a female connector (first connector) 310 and a pair of opposing side walls 311 continuing from the housing 310A of the female connector 310 are provided projectingly on an upper surface of the base plate 307. A pair of square tube-shaped lock portions 314 for locking with a pair of lock projections (lock portions) 313 provided projectingly on the visor-side bracket 306 are further provided projectingly in such a manner as to continue from the opposing side walls 311. The housing 310A of the female connector 310 is formed at a position close to the other end of the bracket 305, the lock portions 314 are formed at a position close to the one end of the bracket 305, and the side walls 311 are formed at an intermediate position in such a form as to connect them.

A central opening 315 is provided in a central portion of the base plate 307 at a position offset from the housing 310A of the female connector 310. The side walls 311 and the lock portions 314 are disposed in face-to-face relation with the central opening 315 located therebetween. The square tube-shaped lock portion 314 has a groove shape formed by three side walls with a side wall on the central opening 315 side removed, and has a flexible lock arm 314a with an engaging pawl on the side wall located away from the central opening 315 side. A lower end face of this lock portion 314 is open so as to be able to receive the lock projection 313 provided projectingly on the visor-side bracket 306.

An engaging portion 316 for temporarily engaging the inner panel 302 (for disengaging the connectors) is provided on an outer surface side of each side wall 311. This engaging portion 316 is formed as a projecting wall of a predetermined width, such that an engaging groove 316a having a width corresponding to the thickness of the inner panel 302 is secured between the engaging portion 316 and the upper surface of the base plate 307.

A make terminal 321, which is electrically connected to a vehicle body-side flat cable (electric wire) 320 that is wired in a through state, is accommodated in the housing 310A of the female connector 310. As a male connector 330 mounted on the visor-side bracket 306 is inserted through an opening at the lower end of the female connector 310, a female terminal 331 on the male connector 330 side and the male terminal 321 can be electrically connected. This male terminal 321 is constituted by an insulation displacement terminal capable of effecting the insulation displacement connection (through connection) with respect to a longitudinally intermediate portion of the flat cable 320 routed in the through state.

A U-shaped groove 322 for accommodating and guiding the flat cable 320 subjected to insulation displacement connection with the male terminal 321 is provided in outer surfaces (an upper surface and side surfaces) of the housing 310A of the female connector 310. A pair of U-shaped grooves 323 for accommodating and guiding the flat cable 320 are also provided on the upper surface of the base plate 307 on both sides of the housing 310A in such a manner as to continue from the U-shaped groove 322. These U-shaped grooves 322 and 323 are shallow, wide grooves of such a depth as to be capable of accommodating the flat cable 320, and traverse an intermediate portion of the bracket 305 between the hook 308 on one end side and the hooks 308 on the other end side in a transverse direction (a direction perpendicular to the aforementioned center line of the bracket) However, since the housing 310A of the female connector 310 is located close to the other end of the bracket 305, these U-shaped grooves 322 and 323 are located in the vicinities of the roots of the hooks 308 on the other end side. Since these U-shaped grooves 322 and 323, particularly the U-shaped grooves 323, are formed in the surface of the base plate 307 of the bracket 305, these portions are formed as thin-walled portions 325, so that the base plate 307 is easily bendable at that portion.

A cover 328 is provided so as to continue from an upper end of the housing 310A of the female connector 310 by means of a hinge 327. As this cover 328 is fitted over and retained on the housing 310A, the male terminal 321 accommodated in the female connector 310 and the flat cable 320 connected thereto can be held so as not to come off.

An opening 302A, into which the female connector 310, the lock portions 314, the engaging portions 316, and the like are inserted, is provided in the inner panel 302 on which the panel-side bracket 305 having the above-described construction is disposed. The opening 302A has a wide portion into which the lock portions 314 and the engaging portions 316 are inserted, as well as a narrow portion into which the female connector 310 is inserted. As the engaging portions 316 inserted through the wide portion are slid toward the narrow portion side, peripheral edge portions of the narrow portion of the opening are adapted to engage the engaging grooves 316a of the engaging portions 316. This engaging structure is designed to hold the panel-side bracket 305 onto the inner panel 302 side to ensure that an excessive force will not be applied to the trim 400. In addition, a pair of mounting holes 302B are provided in the inner panel 302 at positions corresponding to the screw connecting holes 309 in the panel-side bracket 305.

Next, a description will be given of the structure of the visor-side bracket 306 which is assembled onto the panel-side bracket 305 from the obverse surface side (vehicle compartment side) of the trim 400.

The visor-side bracket 306 is disposed on a side of the trim 400, which is an interior member that is fixed to the inner panel 302, away from its side where the panel-side bracket 305 is disposed, and the visor-side bracket 306 is fixed to the inner panel 302. This visor-side bracket 306 has a substantially triangular base plate 337 of a size similar to that of the base plate 307 of the panel-side bracket 305 as a base portion. In the case of this bracket 306 as well, the way in which one end side and the other end side are referred to as such is the same as the case of the bracket 305.

A shaft holding portion 338 for holding a peripheral side portion of a tip portion of the fixing shaft 304 of the sun visor 303 is provided projectingly on the upper surface of the base plate 337 of this bracket 306. The shaft holding portion 338 is formed as a substantially hollow cylindrical member having in its center a shaft holding hole through which the fixing shaft 304 is inserted. The shaft holding portion 338 is formed in such a manner as to be capable of being passed through the central opening 315 in the panel-side bracket 305 and of advancing into the opening 302A of the inner panel 302.

A hook 340, which advances into the opening 302A of the inner panel 302 and engages a peripheral edge portion of the opening 302A, is formed on a front surface (a side of the visor-side bracket 306 on the one end side) of this hollow cylindrical shaft holding portion 338. An inclined surface (inclined portion) 341 which is inclined toward the front side (the one end side of the bracket 306) is provided on a distal end of the hook 340. The arrangement provided is such that when the hook 340 advances into the opening 302A of the inner panel 302, the hook 340 is brought into sliding contact with the peripheral edge portion of the opening 302A in conjunction with its advancing motion, thereby causing the bracket 306 to be slid in the opposite direction to the hook engaging direction.

The male connector 330 accommodating the female terminal 331 is fitted on the upper surface of the visor-side bracket 306. A terminal of a visor-side electric wire 333, which is led out from an end of the fixing shaft 304 inside the shaft holding portion 338, is connected to the female terminal 331. The male connector 330 is structured as an assembly in which the female terminal 331 is accommodated in its housing 330A from below, and a lower surface of the housing 330A is closed by a cover 332. As the male connector 330 in this state is slidingly engaged with an engaging groove in the upper surface of the bracket 306, the male connector 330 is provided uprightly on the upper surface of the base plate 337. Further, the male connector 330 is capable of engaging the female connector 310 on the panel-side bracket 305.

A pair of screw connecting holes 339 for screwing to the inner panel 302 are provided on the base plate 337 of the visor-side bracket 306. These screw connecting holes 339 correspond to the positions of the screw connecting holes 309 in the panel-side bracket 305 and the mounting holes 302B in the inner panel 302, and are located at positions closer to the other end side of the bracket 306 than the aforementioned hook 340.

The pair of lock projections (lock portions) 313 projecting upward are respectively formed on left and right sides of the shaft holding portion 338 on the base plate 337. These lock projections 313 are set to be higher than the male connector 330, and is arranged to be inserted into the square tube-shaped lock portions 314 formed on the above-described panel-side bracket 305 prior to the engagement between the male connector 330 and the female connector 310.

An engaging groove 313a, with which the engaging pawl of the lock arm 314a of the square tube-shaped lock portion 314 is engaged, is formed on a side surface of an upper portion of each lock projection 313. In addition, a guide portion 313b which is substantially pyramidal (quadrangular pyramid-shaped) or substantially conical in shape is formed at an apex of each lock projection 313 to facilitate the insertion of the lock projection 313 into the lock portion 314. Thus the positioning of the visor-side bracket 306 and the panel-side bracket 305 is facilitated.

Next, a description will be given of the structure for connecting the above-described brackets 305 and 306 to the inner panel 302.

FIGS. 14 to 17 are cross-sectional views illustrating the process in which the panel-side bracket 305 and the visor-side bracket 306 described above are fitted to the inner panel 302. A description will be given while referring to these drawings in conjunction with FIG. 13.

To fit the panel-side bracket 5 and the visor-side bracket 306 to the inner panel 302, the panel-side bracket 305 is first disposed in advance on the reverse side (vehicle outer side) of the trim 400, and the hooks 308 are engaged with the peripheral edge portions of the opening 401 in the trim 400, thereby attaching the panel-side bracket 305 to the trim 400. This attaching operation of the panel-side bracket 305 is performed before attaching the trim 400 to the inner panel 302.

When the hooks 308 are engaged with the trim 400, the engagement is effected while the bracket 305 is being bent at its thin-walled portions 325. By doing so, it is unnecessary to force the hook 308 to be engaged with the trim 400, and assembly can be performed simply, further, the circumferential portion of the opening of the trim 400 and the hook 308 are prevented from breaking.

After the panel-side bracket 305 is attached to the reverse surface side of the trim 400, the trim 400 is assembled onto the inner panel 302. At that time, the male terminal 321 of the female connector 310 and the flat cable 320 drawn out from the opening 302A of the inner panel 302 are subjected to insulation displacement connection in advance. After covering the cover 328 on the housing 310A of the female connector 310, the projecting portion of the panel-side bracket 305 side, that is, the female connector 310, the lock portion 314, and the side wall 311 is inserted into the opening 32A of the inner panel 302.

Figure 14:
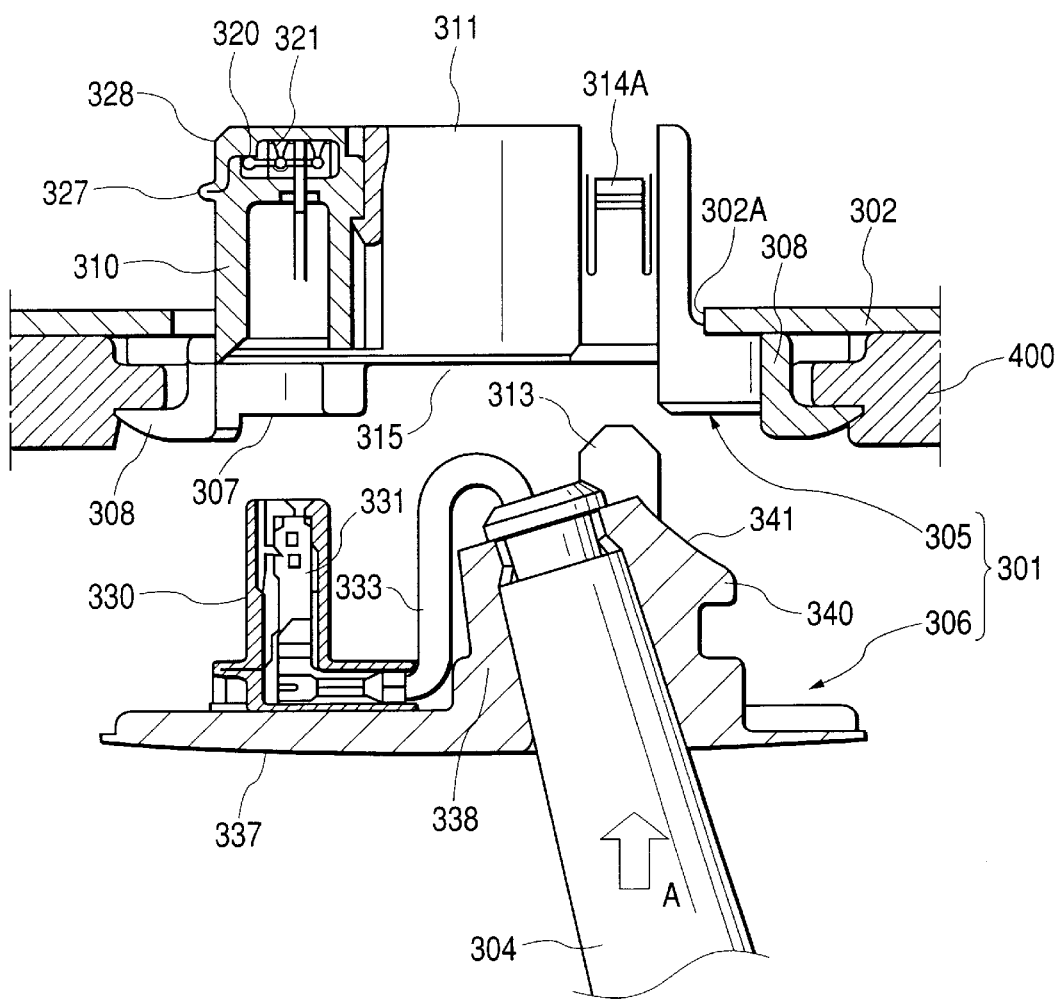
FIG. 14 is an explanatory diagram of the second embodiment and is a cross-sectional view illustrating a state in which a visor-side bracket is assembled onto a panel-side bracket.

FIG. 14 shows this state. In this state, the panel-side bracket 305 is disposed on the underside of the inner panel 302 (on the front surface in the direction in which the visor-side bracket 306 is assembled). In this state, the male connector 330, the lock projections 313, and the shaft holding portion 338 of the visor-side bracket 306 are respectively made to oppose the female connector 310, the lock portions 314, and the central opening 315 of the panel-side bracket 305, and the visor-side bracket 306 is assembled onto the panel-side bracket 305 from the lower surface side.

Namely, as shown in FIG. 14, the visor-side bracket 306 is pressed against the panel-side bracket 305 straightly in the direction indicated by arrow A. Then, the highest lock projections 313 of the visor-side bracket 306 first enter the square tube-shaped lock projections 314 of the panel-side bracket 305, and the male connector 330 then begins to engage the female connector 310. At this time, the pyramidal guide portions 313b are disposed at the tips of the lock projections 313, and the lock projections 313 are guided into the square tube-shaped lock projections 314 before the engagement of the connectors 310 and 330, so that the connectors 310 and 330 and the brackets 305 and 306 are positioned. Consequently, the connecting of the male connector 330 and the female connector 310 is effected positively and easily.

Figure 15:
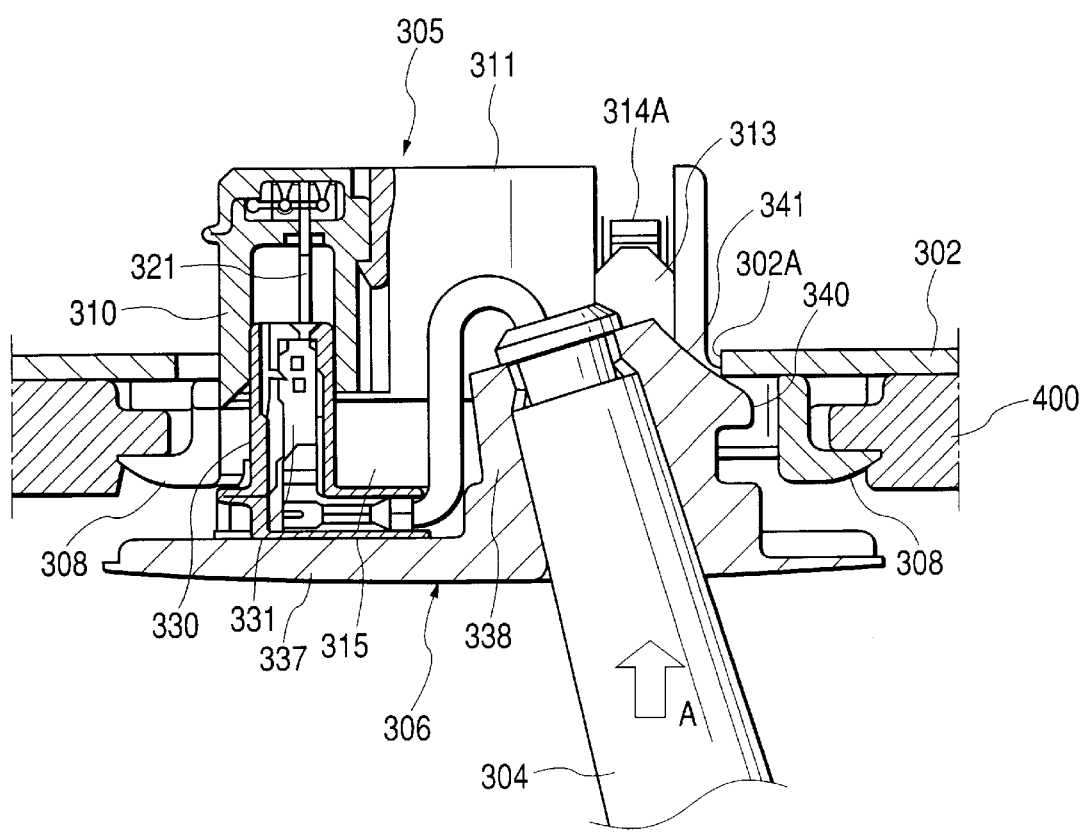
FIG. 15 is a cross-sectional view illustrating a state continuing from the state shown in FIG. 14.
Figure 16:
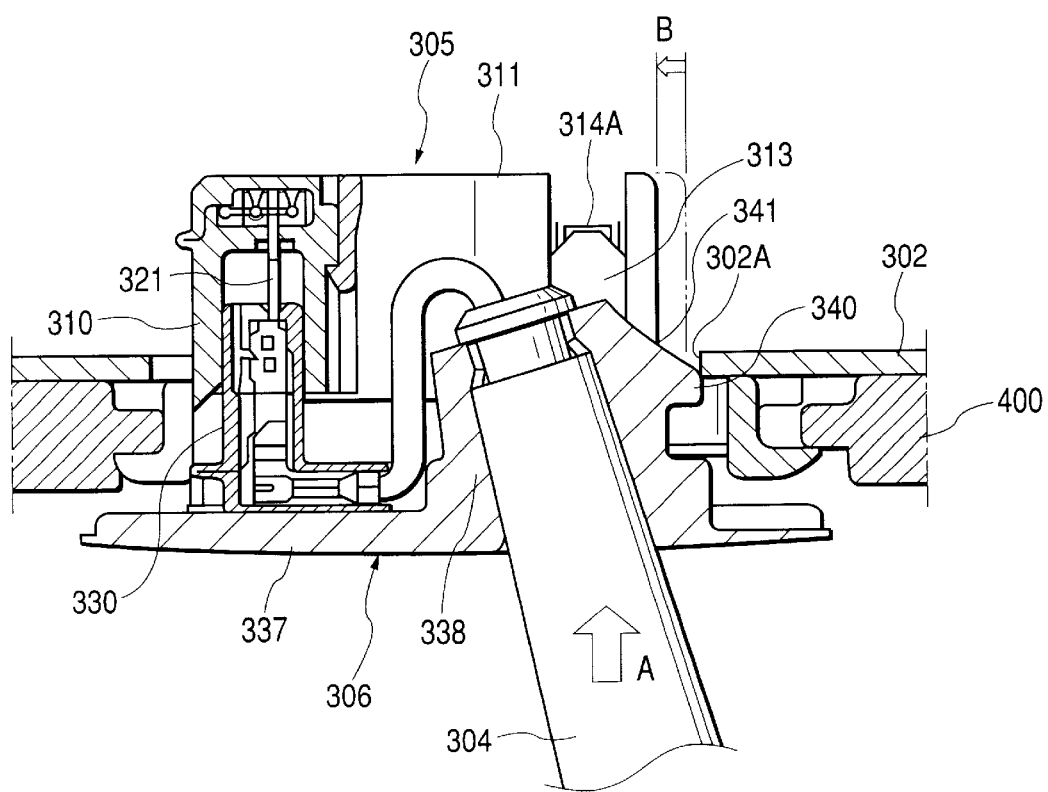
FIG. 16 is a cross-sectional view illustrating a state continuing from the state shown in FIG. 15.

As shown in FIG. 15, when the engagement of the female connector 310 and the male connector 330 begins, the inclined surface 341 at the distal end of the hook 340 of the base plate 306 abuts against the peripheral edge portion of the opening 302A of the inner panel 302. As the visor-side bracket 306 is further pressed against the panel-side bracket 305 side, the two brackets 305 and 306 slide in the opposite direction (the direction of arrow B) to the hook engaging direction due to the action of the inclined surface 341, as shown in FIG. 16. Then, as the brackets 305 and 306 thus slide, the inclined surface 341 of the hook 340 is dislocated from the peripheral edge portion of the opening 302 of the inner panel 302, and the hook 340 passes the opening 302 and advances to the reverse surface side of the inner panel 302. Concurrently, the male connector 330 engages the female connector 310, and the lock projections 313 are fitted in the lock portions 314.

The fact that the connectors 310 and 330 are properly engaged and the brackets 305 and 306 are positively joined can be confirmed by the locking sound occurring when the engaging pawls of the lock arms 314a of the lock portions 314 are engaged in the engaging grooves 313s of the lock projections 313.

Figure 17:
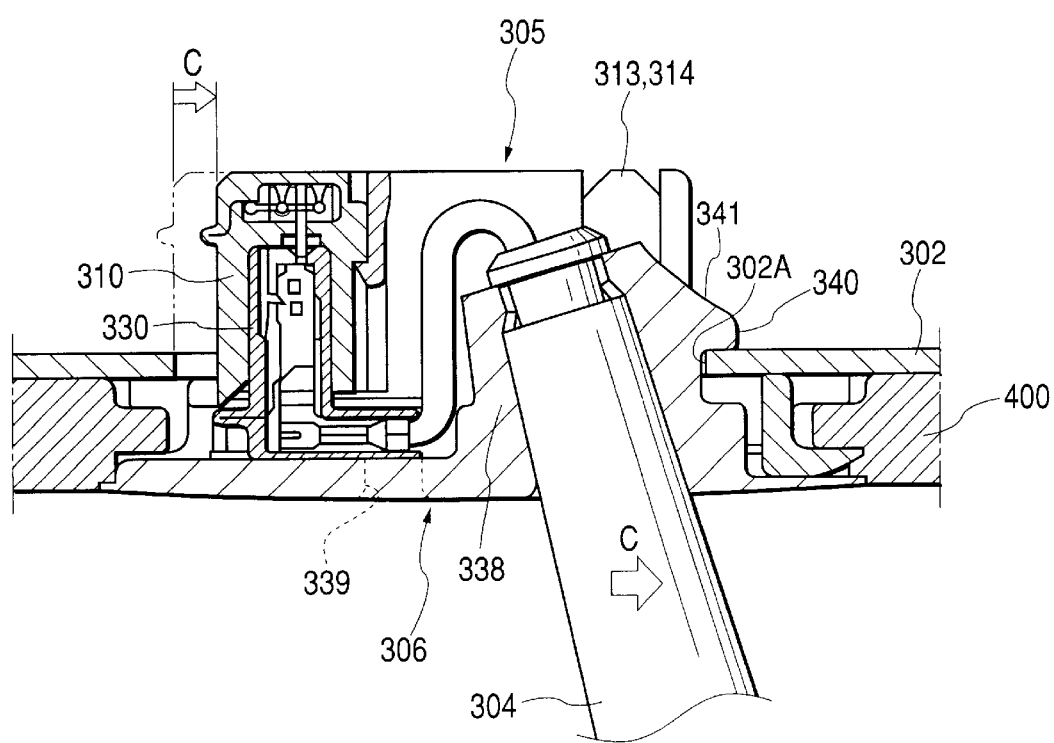
FIG. 17 is a cross-sectional view illustrating a state in which the assembly of the visor-side bracket onto the panel-side bracket has been completed as a stage following that of FIG. 16.
Figure 18:
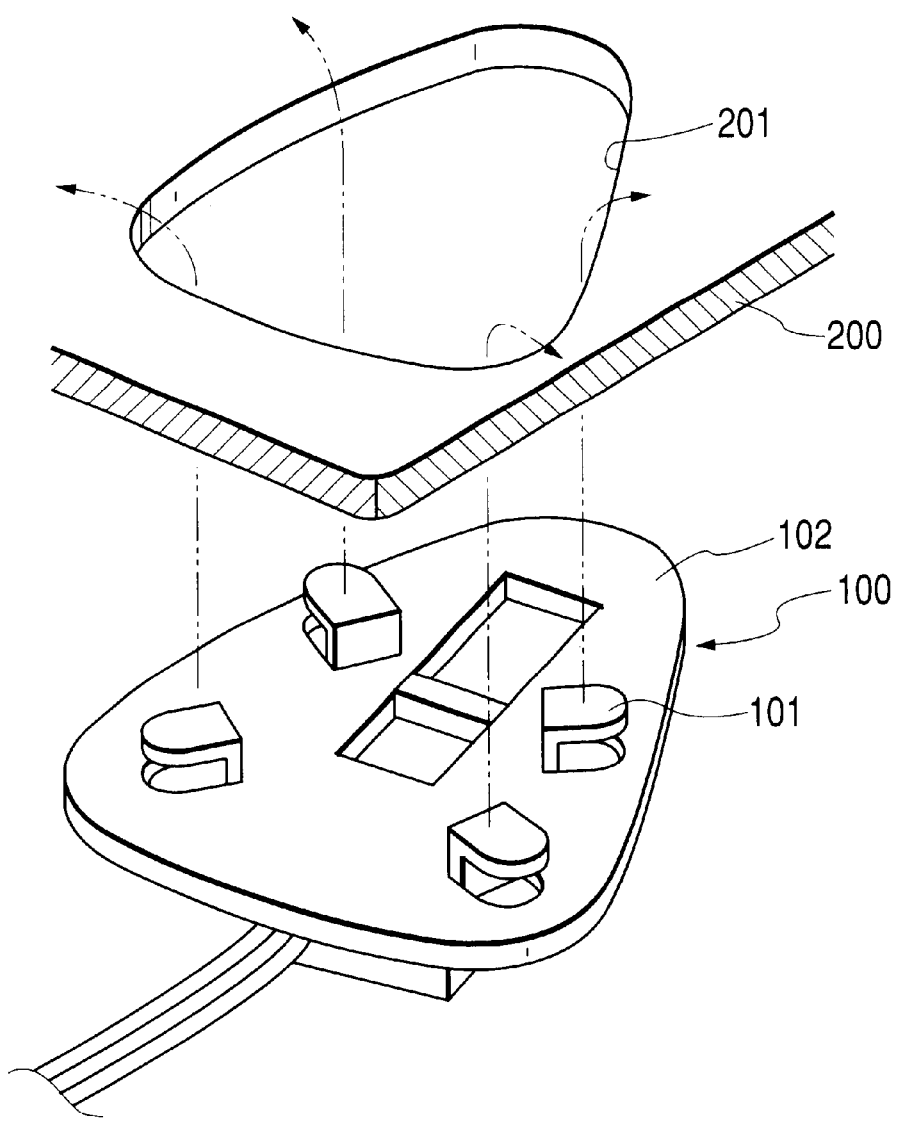
FIG. 18 is a perspective view illustrating a related example of the bracket connecting structure.
Figure 19:
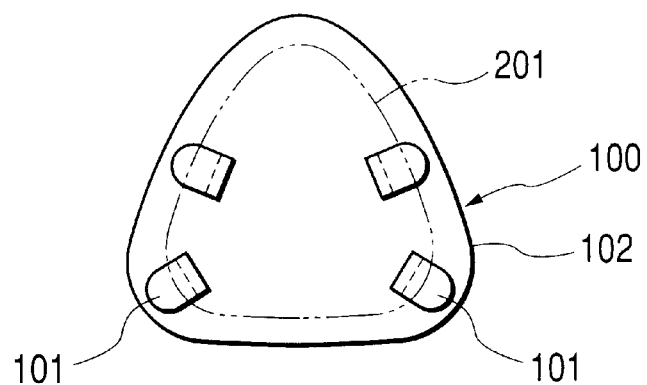
FIG. 19 is a diagram illustrating the relationship between hooks and an opening in the structure shown in FIG. 18.
Figure 20:
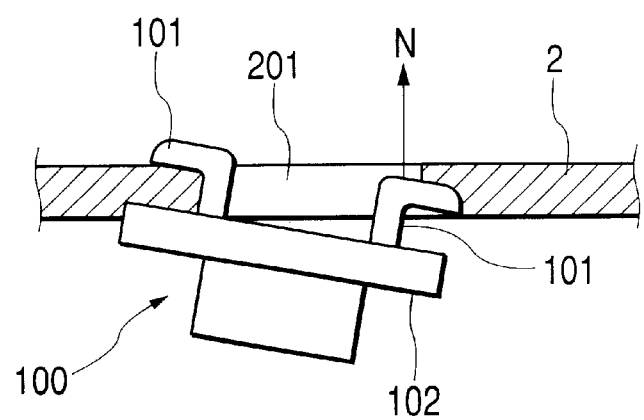
FIG. 20 is a cross-sectional view used in the explanation of an assembling procedure in the structure shown in FIG. 18.
Figure 21:
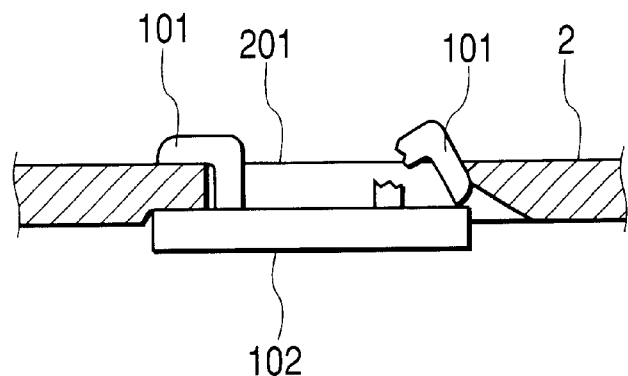
FIG. 21 is a cross-sectional view used in the explanation of problems of the structure shown in FIG. 18.
Figure 22:
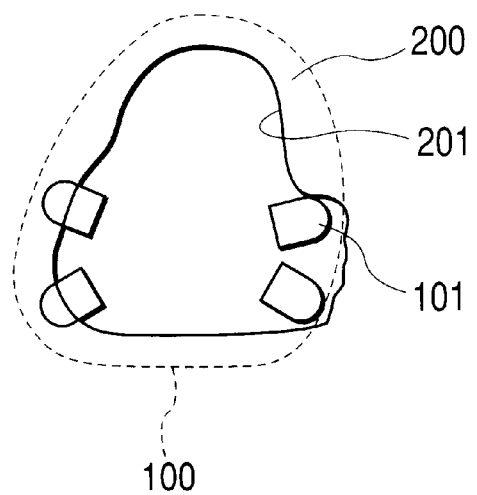
FIG. 22 is a plan view used in the explanation of the problems of the structure shown in FIG. 18.
Figure 23:
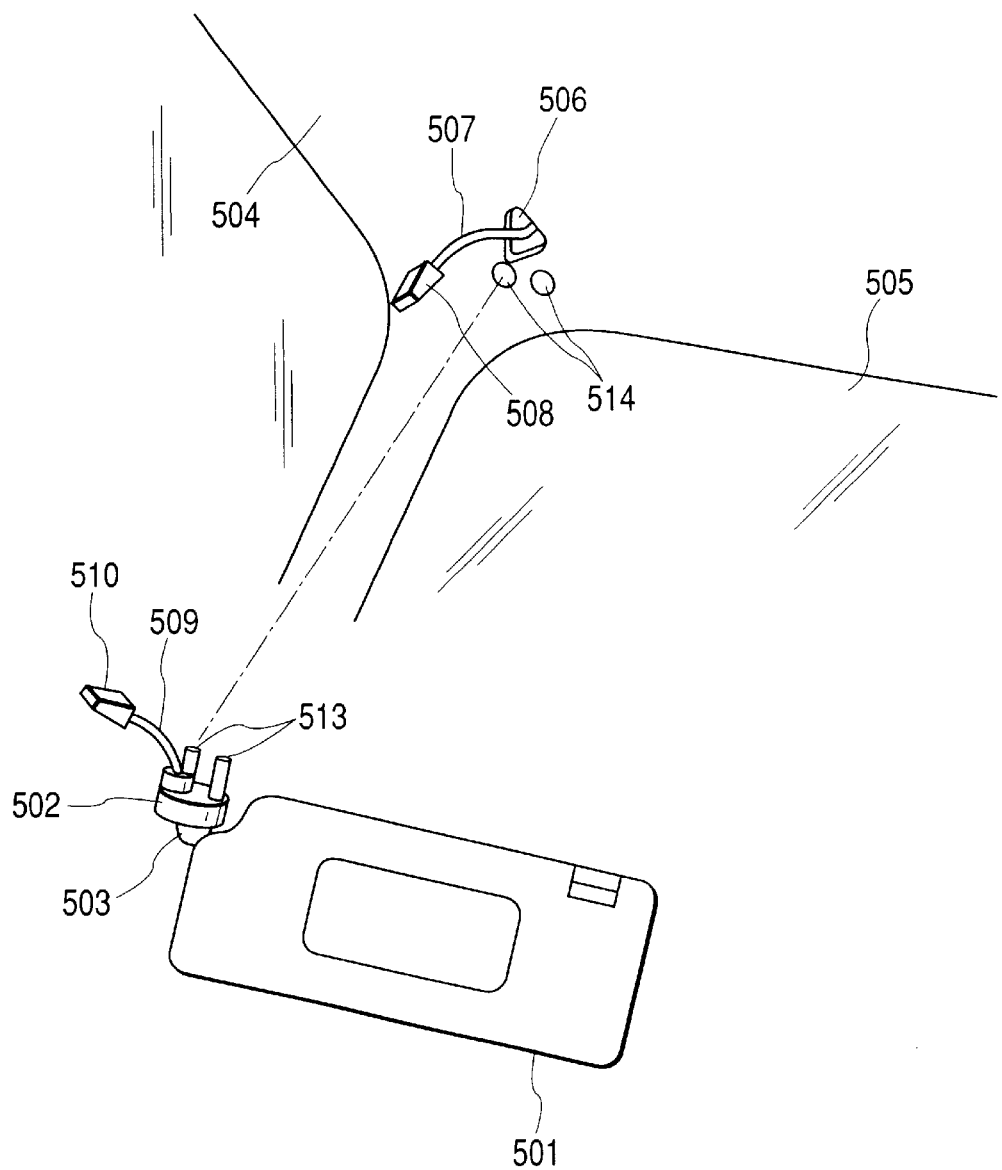
FIG. 23 is a perspective view illustrating a related method of mounting an auxiliary device.
Figure 24:
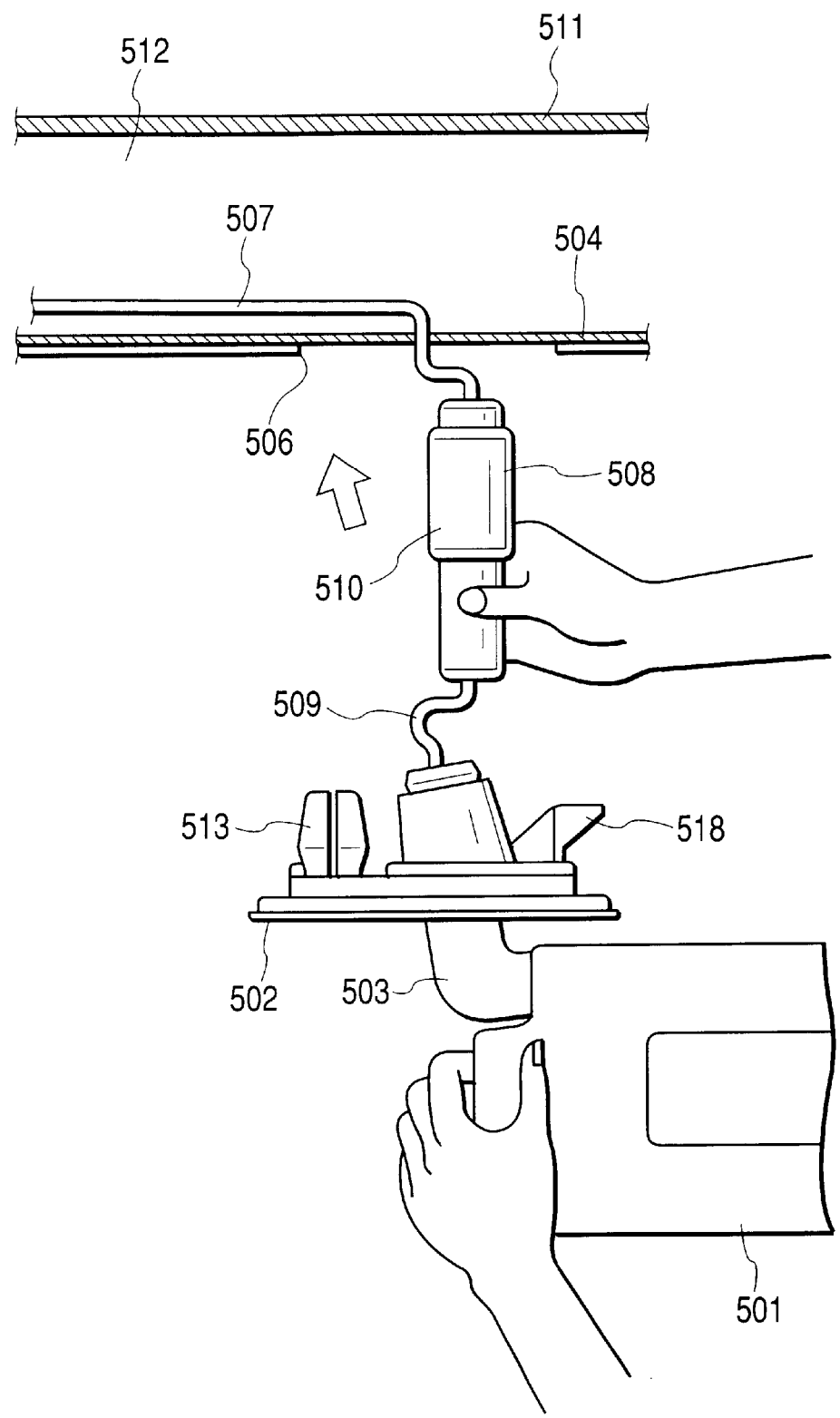
FIG. 24 is an explanatory diagram illustrating the related method of mounting an auxiliary device.
Figure 25:
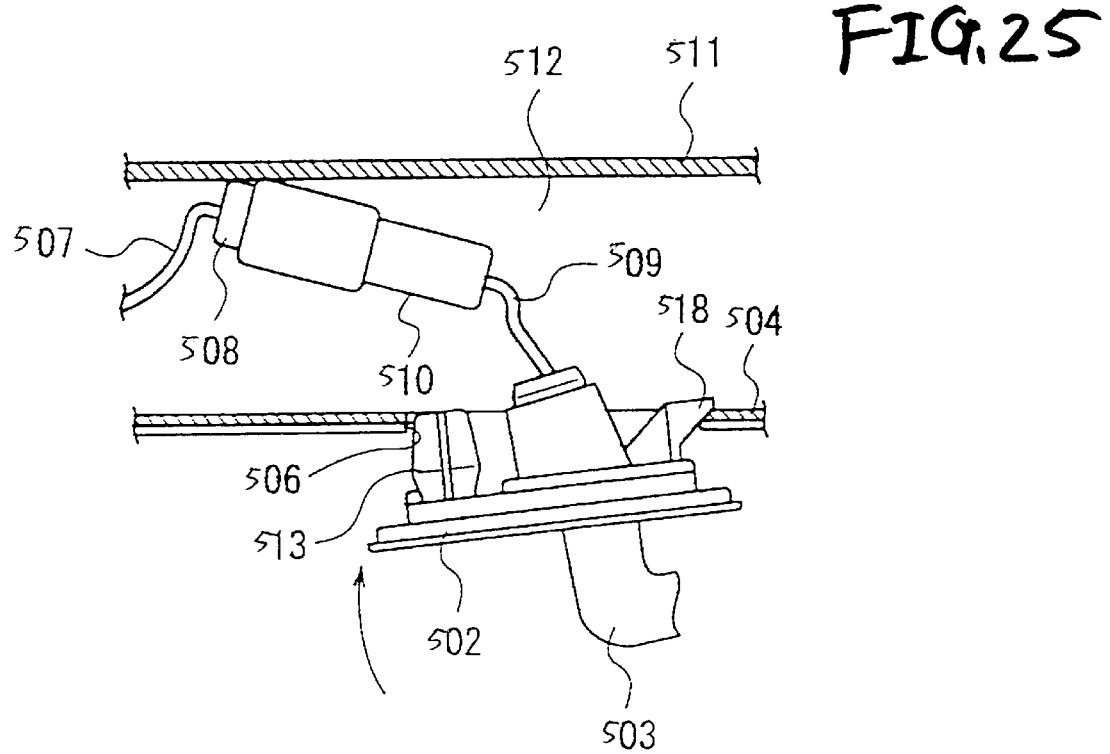
FIG. 25 is an explanatory diagram illustrating the related method of mounting an auxiliary device.
Figure 26:
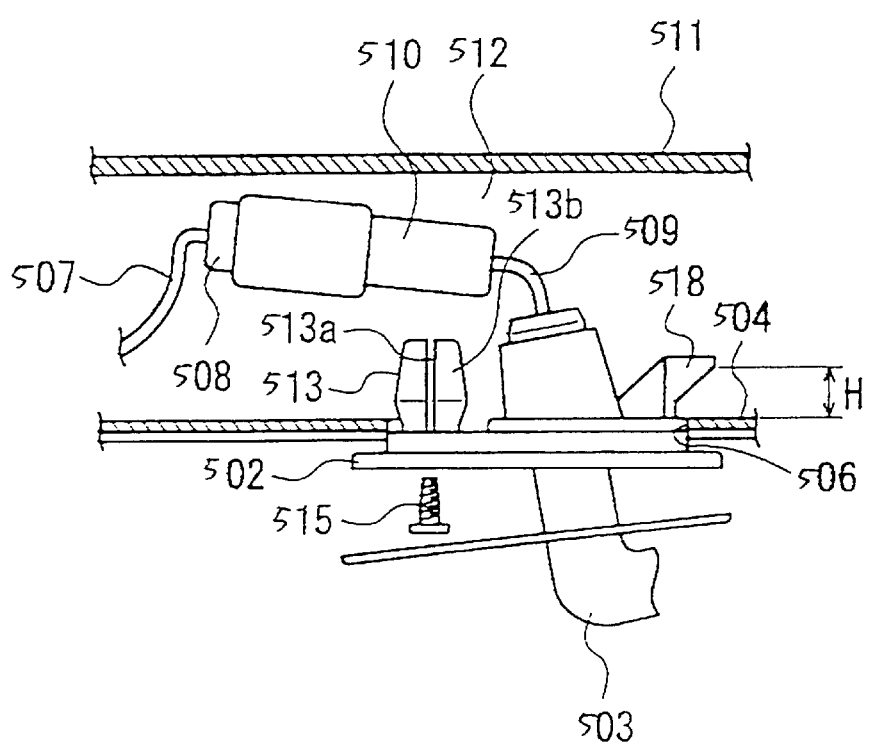
FIG. 26 is an explanatory diagram illustrating the related method of mounting an auxiliary device.

After confirming by the locking sound that this state has been reached, as shown in FIG. 17, the visor-side bracket 306 and the panel-side bracket 305 are slid in the hook engaging direction indicated by arrow C in the drawing, thereby engaging the hook 340 with the peripheral edge portion of the opening 302A of the inner panel 302.

At this time, since the screw connecting holes 309 and 339 of the brackets 305 and 306 are formed in advance so as to be aligned with the mounting holes 302B on the inner panel 302 side in the state in which the hook 340 is properly engaged, by merely sliding the brackets 305 and 306 so as to align the screw connecting holes 309 and 339 with the mounting holes 302B, it is possible to positively engage the hook 340 with the peripheral edge portion of the opening 302A in the inner panel 302.

After temporary engagement is thus completed by the hook 340, screws (fastening members) are inserted and tightened in the positionally aligned screw connecting holes 309 and 339 and mounting holes 302B, thereby completing the mounting of the sun visor 303.

When there has arisen a need to detach the sun visor 303 from the above-described mounted state, the screws are pulled out and the two brackets 305 and 306 are slid in the opposite direction to the hook engaging direction to disengage the hook 340 and the inner panel 302, and the visor-side bracket 306 is pulled downward in that state. Then, the lock projections 313 and the lock portions 314 are disengaged (since this lock is temporary, the lock can be canceled if the visor-side bracket 306 is pulled strongly), and the male connector 330 comes off the female connector 310. At that time, at the point of time when the brackets 305 and 306 have slid in the opposite direction to the hook engaging direction, the engaging portions 316 of the panel-side bracket 305 engage the edges of the narrow portion of the opening 302A of the inner panel 302, and the panel-side bracket 305 is held by the inner panel 302. Therefore, it is possible to disengage the visor-side bracket 306 from the panel-side bracket 305 without applying an excess force to the trim 400.

In the above-described connecting structure, the arrangement provided is such that by sliding the panel-side bracket 305 and the visor-side bracket 306 along the inner panel 302, the hook 340 of the visor-side bracket 306 is engaged with the peripheral edge portion of the opening 302A in the inner panel 302. Therefore, unlike the conventional structure, the clearance between the hook 340 and the inner panel 302 in the assembled state can be set to a minimum. Namely, the clearance can be made practically nil, as shown in FIG. 17.

In addition, in the case of the conventional structure, since a system is adopted in which the hook is caught beforehand at the edge of the opening in the inner panel and the bracket is rotated, it was impossible to secure a large allowance for the engagement of the hook and the panel. However, in the connecting structure of this embodiment, the allowance for the engagement of the hook 340 and the inner panel 302 can be freely set to be relatively large in correspondence with the amount by which the brackets 305 and 306 are slid. Accordingly, the engagement with the inner panel 302 using the hook 340 can be effected positively with high strength in a state in which the looseness or shakiness is nil, so that the sun visor 303 can be secured to the inner panel 302 firmly and positively by means of the brackets 305 and 306.

In addition, since the hook 340 can be properly engaged with the inner panel 302 by merely sliding the brackets 305 and 306 and positioning the screw connecting holes 309 and 339 with respect to the mounting holes 302B on the inner panel 302 side, the positioning operation before screwing down is facilitated, thereby improving the operating efficiency.

In addition, by merely effecting the operation of assembling the visor-side bracket 306 onto the panel-side bracket 305, the brackets 305 and 306 automatically slide in the opposite direction to the hook engaging direction by virtue of the action of the inclined surface 341 at the distal end of the hook 340, thereby guiding the advance of the hook 340 into the opening 302A of the inner panel 302. Therefore, the sliding allowance for engaging the hook 340 can be secured without particularly confirming visually the positional relationship between the hook 340 and the opening 302A of the inner panel side, i.e., by merely pushing the visor-side bracket 306 onto the panel-side bracket 305. Accordingly, the hook 340 can be subsequently engaged properly with the inner panel 302 by merely sliding the brackets 305 and 306 in the hook engaging direction.

In addition, since the hook 340 can be positively engaged with the peripheral edge portion of the opening 302A in the inner panel 302 by merely sliding the brackets 305 and 306 in the hook engaging direction after the confirmation of the locking sound of the lock projections 313 and the lock portions 314, it is possible to prevent erroneous assembling in a state in which the brackets 305 and 306 have not been properly effected. Namely, in a case where the brackets 305 and 306 are slid in the hook engaging direction in the state in which the lock has not been confirmed (i.e., in the state in which the two brackets have not been assembled properly), the movement is effected in a state in which the hook 340 has not positively reached the reverse surface side of the inner panel 302, the hook 340 cannot be properly engaged with the inner panel 302. Additionally, because the hook 340 cannot be properly engaged with the inner panel 302, the positions of the screw connecting holes 309 and 339 on the brackets 305 and 306 side and the mounting holes 302B on the inner panel 302 side cannot be aligned with each other, so that screwing down cannot be effected. Accordingly, it is thereby possible to prevent the erroneous assembling in the state in which the assembling of the brackets 305 and 306 has not been effected properly.

Although in the above-described second embodiment a description has been given of the case in which the sun visor 303 is mounted on the inner panel 302 by using the visor-side bracket 306 after attaching the trim 400 to the inner panel 302, the trim 400 may be assembled onto the inner panel 302 after the visor-side bracket 306 is set in advance in a state of being temporarily fixed to the trim 400 (a roof module state). In such a case as well, when the trim 400 is assembled onto the inner panel 302, the brackets 305 and 306 similarly slide in the opposite direction to the hook engaging direction by virtue of the action of the inclined surface 341 of the hook 340. Accordingly, if the brackets 305 and 306 are subsequently slid so as to align the screw connecting holes 309 and 339 with the mounting holes 302B of the inner panel 302, the proper engagement of the hook 340 is completed.

In addition, the brackets 305 and 306 can be attached by using screw grommets (fastening members) instead of merely fastening with the screws. In that case, it suffices if a bracket casing is prepared separately in advance, and screw grommets (fastening members) provided projectingly on the casing are inserted into the screw connecting holes 309 and 339 and the mounting holes 302B by fitting this bracket casing from the lower surface side of the visor-side bracket 306. Subsequently, the brackets 305 and 306 can be fastened to the inner panel 302 by tightening the screws into the screw grommets Although a description has been given above of the second embodiment, the invention is not limited to the same, and various modifications incidental to the gist of the arrangement of the invention are possible. For example, although the sun visor is used as the auxiliary device in the above-described embodiment, the invention is applicable to other auxiliary devices such as interior lamps.

As described above, in accordance with the invention, since the hooks provided on the one end side and the other end side of the base plate can be easily engaged with the opposing peripheral edge portions of the opening without applying an excessive force, there is no risk of breaking the peripheral edge portions of the opening in the plate member to be attached to and of breaking the hooks, and the assembling operation can be improved.

In accordance with the invention, since the U-shaped groove which forms the thin-walled portion is used as a groove for accommodating the electric wire, the conception of providing the wire accommodating groove consequently makes it possible to improve the operating efficiency in attaching the bracket. In addition, since the U-shaped groove for forming the thin-walled portion and the wire accommodating groove need not be provided separately, the bracket does not become large in size, and the construction of the bracket can be simplified.

In accordance with the invention, through connection in which a plurality of auxiliary devices are arranged and disposed on a single electric wire is made possible, so that the routing can be simplified.

As described above, in accordance with the invention, the clearance between the hook and the panel can be set to a minimum, and the allowance for the engagement of the hook and the panel can be set to be large. Accordingly, it is possible to eliminate looseness or shakiness in the engaging portions of the hook and the panel, and the force for engaging the hook and the panel can be increased. Consequently, the first and second brackets can be fastened to the panel positively and firmly. In addition, since the hook can be properly engaged at the peripheral edge portion of the panel opening by merely aligning the connecting hole of the second bracket with the connecting hole of the panel, the operation up to the passing of the fastening member can be facilitated.

In accordance with the invention, by merely effecting the operation of assembling the second bracket onto the first bracket, the brackets automatically slide in the opposite direction to the hook engaging direction by virtue of the action of the inclined portion at the distal end of the hook to guide the advance of the hook into the panel opening. Accordingly, it is unnecessary to assemble the second bracket while visually confirming the positional relationship between the hook and the opening on the panel side, so that the operational efficiency improves.

In accordance with the invention, the hook can be positively engaged with the peripheral edge portion of the opening in the panel by merely sliding the brackets in the hook engaging direction after the confirmation of the locked state of the lock mechanism. On the other hand, in a case where the brackets are slid in the hook engaging direction in the state in which the lock has not been confirmed (i.e., in the state in which the two brackets have not been assembled properly), the movement is effected in a state in which the hook has not positively reached the reverse surface side of the panel, so that the hook cannot be properly engaged with the panel. Additionally, because the hook cannot be properly engaged with the panel, the positions of the screw connecting hole on the second bracket side and the screw connecting hole on the panel side cannot be aligned with each other, so that screwing down cannot be effected. Accordingly, it is thereby possible to prevent the erroneous assembling in the state in which the assembling of the brackets has not been effected properly.

What is claimed is:

1. A bracket comprising:
a base plate;
a pair of hooks, for engaging with opposing peripheral edge portions of an opening formed through a plate member, respectively, so that the bracket is attached to the plate member, provided at opposite ends of the base plate; and
a thin-walled portion having a thickness thinner than a thickness of the base plate, said thin-walled portion traversing the base plate at an intermediate portion of the base plate between the pair of hooks;
wherein said thin-walled portion is operable to allow deflection of the base plate at the thin-walled portion.

2. The bracket according to claim 1, wherein each hook of the pair of hooks has an L-shaped cross section whose distal end is oriented outwardly.

3. The bracket according to claim 1, wherein the thin-walled portion is defined by a U-shaped groove for accommodating an electric wire.

4. A bracket comprising:
a base plate;
a pair of hooks, for engaging with opposing peripheral edge portions of an opening formed through a plate member, respectively, so that the bracket is attached to the plate member, provided at opposite ends of the base plate;
a thin-walled portion having a thickness thinner than a thickness of the base plate, which traverses an intermediate portion of the base plate between the pair of hooks,
wherein the thin-walled portion is defined by a U-shaped groove for accommodating an electric wire; and a connector disposed midway in the U-shaped groove so that the electric wire which is disposed in the U-shaped groove is electrically connected to the connector.

5. The bracket according to claim 4, wherein the connector includes an insulation displacement terminal, and the connector and the electric wire are electrically connected by subjecting an intermediate portion of the electric wire which is disposed in the U-shaped groove to insulation displacement connection to the insulation displacement terminal.

6. A bracket connecting structure comprising:

a first bracket including a first connector and attached to an opening formed through a panel;

a second bracket, for supporting an auxiliary device, including a second connector connectable to the first connector;

a hook, for engaging with the opening of the panel, projecting from the second bracket;

wherein after the second bracket is advanced toward the first bracket in a first direction so that the hook passes through the opening of the panel, the first and second brackets are adapted to slide in a second direction substantially perpendicular to the first direction so that the hook is engaged with the opening of the panel, and a fastening member for connecting the first and second bracket to the panel by being passed through a connecting hole formed through the second bracket and a connecting hole formed through the panel which are aligned with each other in a state in which the hook is engaged with the opening of the panel.

7. The bracket connecting structure according to claim 6, wherein the second bracket is provided with an inclined portion which is brought into sliding contact with the opening of the panel in conjunction with the advancing movement of the hook into the opening of the panel to cause the second bracket to slide in an opposite direction to the second direction.

8. The bracket connecting structure according to claim 6, wherein lock portions are respectively provided on the first and second brackets for locking the first and second brackets together when the hook has positively advanced to the panel and the first bracket and the second bracket have been set in a mutually properly assembled state.

9. The bracket connecting structure according to claim 6, wherein the first connector is connected to the second connector when the second bracket is advanced to the first bracket.

10. The bracket according to claim 3, wherein a width of the U-shaped groove at a peripheral edge of the base plate is larger than a width of the U-shaped groove at a central portion of the base plate.

11. The bracket according to claim 3, wherein the U-shaped groove for accommodating an electric wire traverses the bracket in a direction perpendicular to a center line of the bracket, wherein the center line of the bracket intersects each hook of the pair of hooks.

12. The bracket according to claim 4, wherein the U-shaped groove for accommodating an electric wire traverses the bracket in a direction perpendicular to a center line of the bracket, wherein the center line of the bracket intersects each hook of the pair of hooks, and wherein the U-shaped groove is disposed closer to a first hook of the pair of hooks than to a second hook of the pair of hooks.

* * * * *